(12) United States Patent　　(10) Patent No.:　US 12,693,903 B2

Kita　　(45) Date of Patent:　　Jul. 28, 2026

(54) ARRANGEMENT SYSTEM AND ARRANGEMENT METHOD

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 729 days.

(21) Appl. No.: 18/006,152

(22) PCT Filed: Mar. 30, 2022

(86) PCT No.: PCT/JP2022/016253

§ 371 (c)(1),
(2) Date: Jan. 20, 2023

(87) PCT Pub. No.: WO2023/188185

PCT Pub. Date: Oct. 5, 2023

(65) Prior Publication Data

US 2024/0248763 A1　　Jul. 25, 2024

(51) Int. Cl.
*G06F 9/50*　　(2006.01)

(52) U.S. Cl.
CPC ................................. *G06F 9/5038* (2013.01)

(58) Field of Classification Search
CPC ........................................ G06F 9/45533–5094
See application file for complete search history.

(56) References Cited

U.S. PATENT DOCUMENTS

| | | | | |
|---|---|---|---|---|
| 2013/0073731 A1* | 3/2013 | Bose | ..................... | G06F 9/5088 709/226 |
| 2015/0319230 A1* | 11/2015 | Skjolsvold | .............. | H04L 43/04 709/224 |

| | | | | |
|---|---|---|---|---|
| 2016/0226789 A1* | 8/2016 | Sundararajan | ........ | G06F 9/5088 |
| 2016/0316003 A1* | 10/2016 | Snider | ................. | H04L 67/1001 |
| 2016/0328273 A1* | 11/2016 | Molka | ...................... | A61B 8/00 |
| 2017/0344394 A1* | 11/2017 | Ansari | ................... | H04L 47/83 |

(Continued)

FOREIGN PATENT DOCUMENTS

WO　　2018181826 A1　　10/2018

OTHER PUBLICATIONS

Coordinating Workflow Allocation and Execution in Mobile Environments Rohan Sen, Gregory Hackmann, Mart Haitjema, Gruia-Catalin Roman, and Christopher Gill (Year: 2007).*

(Continued)

*Primary Examiner* — April Y Blair

*Assistant Examiner* — Paul V Mills

(74) *Attorney, Agent, or Firm* — HAUPTMAN HAM, LLP

(57)　　　　　　ABSTRACT

A policy manager module identifies, for each of a plurality of applications, a requirement being associated with a type of the application and relating to an execution platform on which the application is deployable. The policy manager module determines an order of the plurality of applications based on the identified requirement. The policy manager module determines, in accordance with the determined determination order, the execution platforms on which the respective plurality of applications are to be arranged. A life cycle management module, a container management module, and a configuration management module arrange each of the plurality of applications on the execution platform determined for the application.

14 Claims, 10 Drawing Sheets

(56) References Cited

U.S. PATENT DOCUMENTS

| 2018/0260200 A1 | 9/2018 | Karagiannis et al. |
| 2020/0013107 A1 | 1/2020 | Kusano |
| 2020/0042392 A1* | 2/2020 | Alluboyina ......... G06F 11/1464 |

OTHER PUBLICATIONS

Parallel Solver for Vehicle Routing and Pickup and Delivery Problems with Time Windows Based on Agent Negotiation Petr Kalina and Jin Voknnek (Year: 2012).*

* cited by examiner

FIG.6

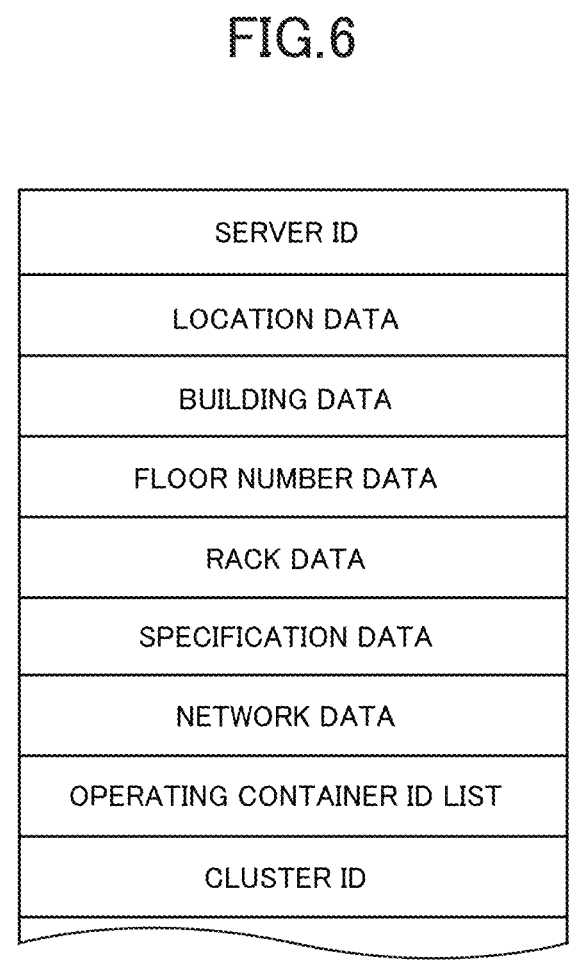

| SERVER ID |
| --- |
| LOCATION DATA |
| BUILDING DATA |
| FLOOR NUMBER DATA |
| RACK DATA |
| SPECIFICATION DATA |
| NETWORK DATA |
| OPERATING CONTAINER ID LIST |
| CLUSTER ID |

POWER CONSUMPTION AP RESOURCE DATA

NETWORK AP RESOURCE DATA

STORAGE AP RESOURCE DATA

MEMORY AP RESOURCE DATA

CPU AP RESOURCE DATA

|  | WEEKDAY | HOLIDAY |
|---|---|---|
| 0:00-3:00 | a1 | a9 |
| 3:00-6:00 | a2 | a10 |
| 6:00-9:00 | a3 | a11 |
| 9:00-12:00 | a4 | a12 |
| 12:00-15:00 | a5 | a13 |
| 15:00-18:00 | a6 | a14 |
| 18:00-21:00 | a7 | a15 |
| 21:00-0:00 | a8 | a16 |

FIG.9

| REQUIREMENT | STRENGTH |
|---|---|
| SAME KUBERNETES CLUSTER AS THAT OF AMF | 5 |
| SAME FABRIC NETWORK AS THAT OF AMF | 4 |
| SAME DATA CENTER AS THAT OF AMF | 3 |
| UNDER CONTROL OF SAME EDGE ROUTER AS THAT OF AMF | 2 |
| SAME RANGE AS THAT OF AMF | 1 |

ARRANGEMENT SYSTEM AND ARRANGEMENT METHOD

RELATED APPLICATIONS

The present application is a National Phase of International Application Number PCT/JP2022/016253, filed Mar. 30, 2022.

TECHNICAL FIELD

The present invention relates to an arrangement system and an arrangement method.

BACKGROUND ART

As an example of a technology relating to construction of each application such as a network function on an execution platform, in Patent Literature 1, there is described a technology for deconstructing an order of a product purchased by a customer into virtualized network function (VNF) units and deploying the VNF units on a network functions virtualization infrastructure (NFVI).

CITATION LIST

Patent Literature

[Patent Literature 1] WO 2018/181826 A1

SUMMARY OF INVENTION

Technical Problem

Such construction of each application as described in Patent Literature 1 involves, depending on a type of application, an application required to be arranged on an execution platform that satisfies a requirement associated with the type.

Accordingly, when a plurality of types of applications are arranged on execution platforms in a random order, there may occur an adverse situation in which resources of the execution platforms cannot be utilized effectively. For example, there may occur a situation in which an application arranged at a later time cannot be arranged on any execution platform or a situation in which there is an imbalance between the execution platforms on which the applications are arranged.

The present invention has been made in view of the above-mentioned circumstances, and has an object to provide an arrangement system and an arrangement method which are capable of effectively utilizing resources of execution platforms on which a plurality of types of applications are constructed.

Solution to Problem

In order to solve the above mentioned problems, according to one embodiment of the present invention, there is provided an arrangement system including: requirement identification means for identifying, for each of a plurality of applications, a requirement being associated with a type of the each of the plurality of the applications and relating to an execution platform on which the each of the plurality of the applications is deployable; order determination means for determining, based on the requirement, an order of the plurality of the applications; execution determination for platform means determining, in accordance with the determined order, the execution platforms on which the respective plurality of the applications are to be arranged; and arrangement means for arranging each of the plurality of the applications on the execution platform determined for the each of the plurality of the applications.

In one aspect of the present invention, the arrangement means is configured to newly construct, for one of the plurality of the applications that has not yet been constructed, the one of the plurality of the applications on the execution platform determined for the one of the plurality of the applications, when the each of the plurality of the applications is arranged on the execution platform determined for the each of the plurality of the applications.

Further, in one aspect of the present invention, the arrangement means is configured to replace, for one of the plurality of the applications that has already been constructed, the one of the plurality of the applications onto the execution platform determined for the one of the plurality of the applications, when the each of the plurality of the applications is arranged on the execution platform determined for the each of the plurality of the applications.

Further, in one aspect of the present invention, the arrangement system further includes constraint strength data storage means for storing constraint strength data in which the requirement and a constraint strength in the arrangement of each of the plurality of the applications are associated with each other, and the order determination means is configured to determine the order so that the order becomes a descending order of the constraint strength identified based on the requirement and the constraint strength data.

As another example, the each of the plurality of the applications is any one of an application that is deployable only on a particular execution platform, an application that is deployable on the execution platform that satisfies a predetermined condition, or an application that is deployable on any execution platform, and the order determination means is configured to determine the order so that the order becomes a stated order of the application that is deployable only on a particular execution platform, the application that is deployable on the execution platform that satisfies a predetermined condition, and the application that is deployable on any execution platform.

Further, in one aspect of the present invention, the order determination means is configured to place, in the order, one of the plurality of the applications of a first type at a position after one of the plurality of the applications of a second type when a requirement relating to the execution platform on which the one of the plurality of the applications of the first type is deployable is a requirement relating to a location of the one of the plurality of the applications of the second type.

Further, in one aspect of the present invention, the requirement identification means is configured to identify, for the each of the plurality of the applications, a plurality of kinds of requirements relating to the execution platform on which the each of the plurality of the applications is deployable, the order determination means is configured to determine, for each of the plurality of kinds of requirements, the order based on the each of the plurality of kinds of requirements, and the execution platform determination means is configured to determine, in accordance with any one of a plurality of the orders determined for the respective plurality of kinds of requirements, the execution platforms on which the plurality of the applications are to be arranged.

In this aspect, the arrangement system may further include leveling index value calculation means for calculating, for each of the plurality of the orders determined for the respective plurality of kinds of requirements, a leveling index value indicating, in a case in which the plurality of the applications have been arranged on the execution platforms in accordance with the each of the plurality of the orders, at least one of a degree of leveling of a resource usage status on each individual execution platform or a degree of leveling of resource usage statuses among the plurality of the execution platforms, and the execution platform determination means may be configured to determine the execution platforms on which the plurality of the applications are to be arranged in accordance with an order determined based on the leveling index value from among the plurality of the orders determined for the respective plurality of kinds of requirements.

As another example, the order determination means may be configured to determine the order based on the requirement of a certain kind among the plurality of kinds, the arrangement system may further include leveling index value calculation means for calculating a leveling index value indicating, in a case in which the plurality of the applications have been arranged on the execution platforms in accordance with the determined order, at least one of a degree of leveling of a resource usage status on each individual execution platform or a degree of leveling of resource usage statuses among the plurality of the execution platforms, the execution platform determination means may be configured to determine, when the degree of leveling indicated by the leveling index value is higher than a predetermined degree, the execution platforms on which the plurality of the applications are to be arranged, in accordance with the determined order, and the order determination means may be configured to again determine, when the degree of leveling indicated by the leveling index value is not higher than the predetermined degree, the order based on the requirement of another kind among the plurality of kinds.

The resource usage status may be at least one of a usage status of a CPU, a usage status of a memory, a usage status of a storage, a usage status of a network, or a usage status of electric power.

Further, in one aspect of the present invention, the execution platform is a cluster formed of one or more containers generated by a virtualization technology.

Further, in one aspect of the present invention, each of the plurality of the applications is an application included in a communication system.

In this aspect, the each of the plurality of the applications may be a network function.

Further, according to one embodiment of the present invention, there is provided an arrangement method including the steps of: identifying, for each of a plurality of applications, a requirement being associated with a type of the each of the plurality of the applications and relating to an execution platform on which the each of the plurality of the applications is deployable; determining, based on the requirement, an order of the plurality of the applications; determining, in accordance with the determined order, the execution platforms on which the respective plurality of the applications are to be arranged; and arranging each of the plurality of the applications on the execution platform determined for the each of the plurality of the applications.

BRIEF DESCRIPTION OF DRAWINGS

FIG. 6 is a diagram for illustrating an example of data structure of physical inventory data.

FIG. 9 is a table for showing an example of constraint strength data.

DESCRIPTION OF EMBODIMENTS

One embodiment of the present invention is now described in detail with reference to the drawings.

Figure 1:
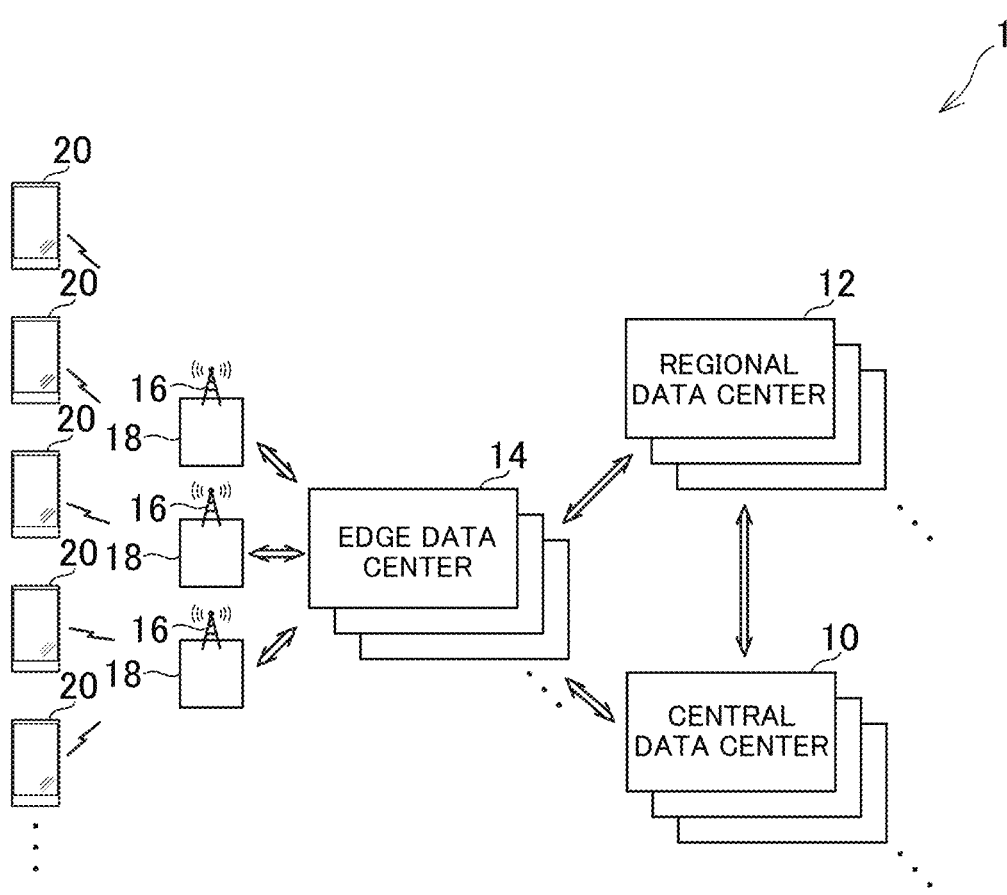
FIG. 1 is a diagram for illustrating an example of a communication system in one embodiment of the present invention.
Figure 2:
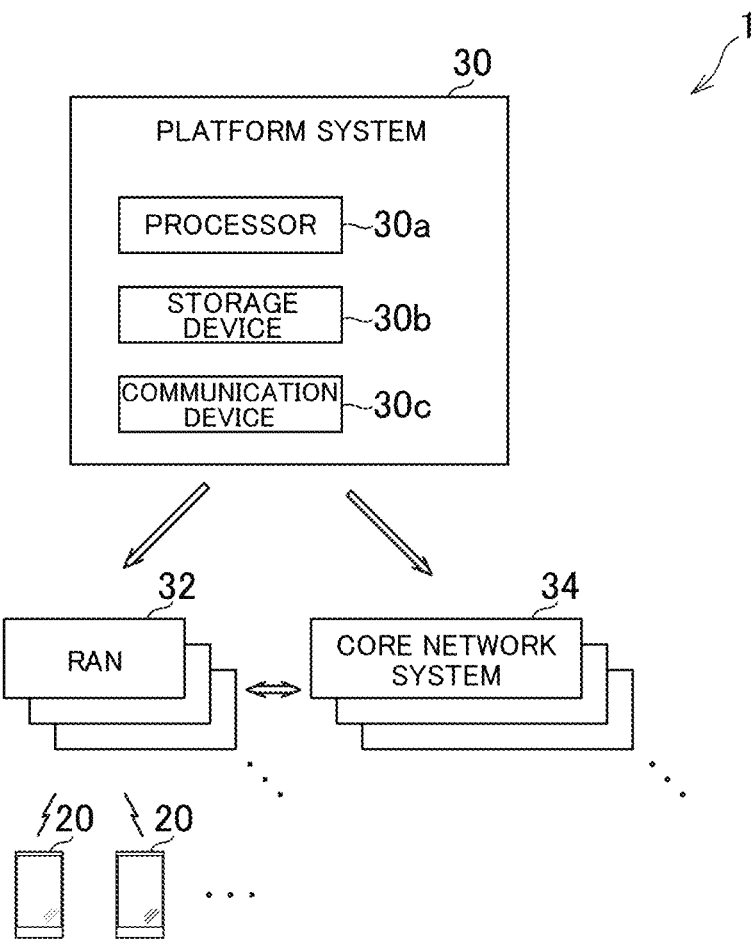
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to/from a communication facility 18 provided with an antenna 16. In this case, as illustrated in FIG. 1, one edge data center 14 may be capable of communicating to/from several communication facilities 18. The communication facility 18 may include a computer such as a server computer. The communication facility 18 in this embodiment performs radio communication to/from a user equipment (UE) 20 via the antenna 16. The communication facility 18 provided with the antenna 16 is provided with, for example, a radio unit (RU), which is described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate to/from one another. Communication can also be performed between the central data centers 10, between the regional data centers 12, and between the edge data centers 14.

As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30a, a storage device 30b, and a communication device 30c, as illustrated in FIG. 2. The processor 30a is a program control device such as a microprocessor which operates in accordance with a program installed in the platform system 30. The storage device 30b is, for example, a storage element such as a ROM or RAM, a solid state drive (SSD), a hard disk drive (HDD), or the like. The storage device 30b stores a program to be executed by the processor 30a, and the like. The communication device 30c is, for example, a communication interface such as a network interface controller (NIC) or a wireless local area network (LAN) module. Software-defined networking (SDN) may be implemented in the communication device 30c. The communication device 30c exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service such as a voice communication service, a data communication service, or the like is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication to/from other users via the RAN 32 or the core network system 34. The UE 20 of the end user can also access a data network such as the Internet via the RAN 32 or the core network system 34.

In addition, in this embodiment, an Internet of things (IoT) service may be provided to an end user who uses a robot arm, a connected car, or the like. In this case, an end user who uses, for example, a robot arm, a connected car, or the like may be a purchaser of the network service in this embodiment.

In this embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in this embodiment is formed of one or a plurality of functional units (for example, network function (NF)). In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or a plurality of CNFs. The functional unit in this embodiment may also correspond to a network node.

Figure 3:
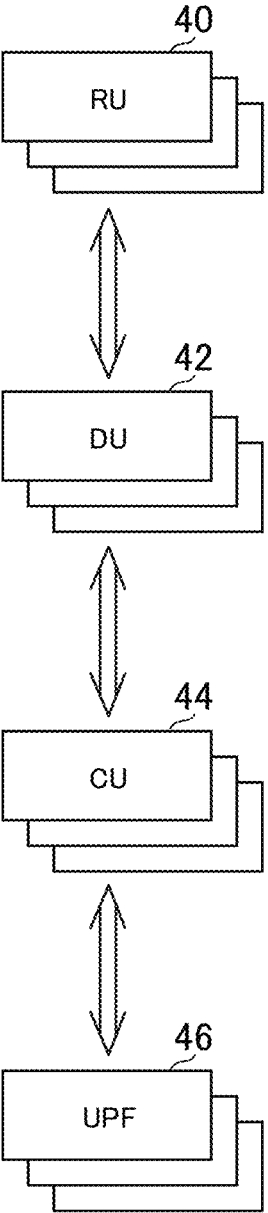
FIG. 3 is a diagram for schematically illustrating an example of a network service in the one embodiment of the present invention.

FIG. 3 is a diagram for schematically illustrating an example of an operating network service. The network service illustrated in FIG. 3 includes NFs, such as a plurality of RUs 40, a plurality of DUs 42, a plurality of CUs 44, and a plurality of user plane functions (UPFs) 46, as software elements. The network service also includes other software elements, such as access and mobility management functions (AMFs) and session management functions (SMFs), but description of those elements is omitted. In addition, the network service is implemented on a plurality of servers or other computer resources (hardware elements).

In this embodiment, for example, the network service illustrated in FIG. 3 provides a communication service in a certain area.

In this embodiment, it is also assumed that the plurality of RUs 40, the plurality of DUs 42, the plurality of CUs 44, and the plurality of UPFs 46, which are illustrated in FIG. 3, belong to one end-to-end network slice.

Figure 4:
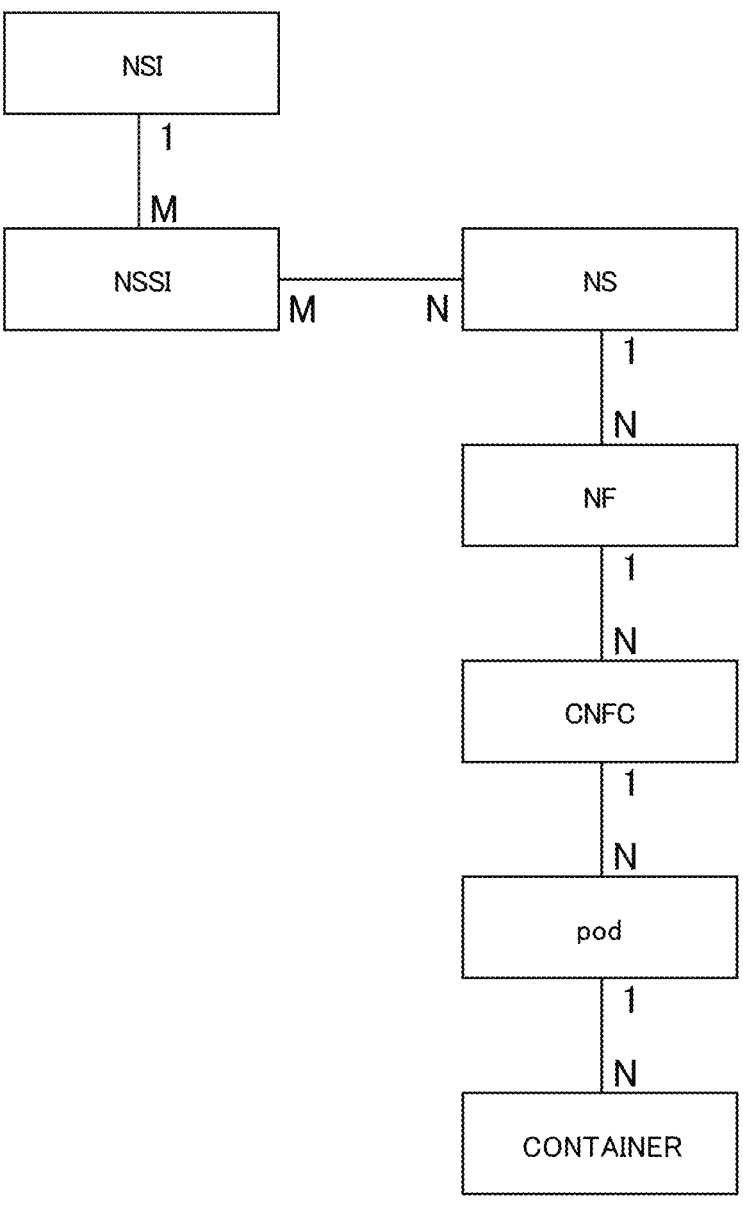
FIG. 4 is a diagram for illustrating an example of links between elements constructed in the communication system in the one embodiment of the present invention.

FIG. 4 is a diagram for schematically illustrating an example of links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the DU 42, the CU 44, or the UPF 46. The NF also corresponds to an element having a granularity, such as an AMF or an SMF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NFs. That is, one or a plurality of NEs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU 42, the CU 44, and the like. Some CNFCs may be microservices that provide a part of the functions of the UPF 46, the AMF, the SMF, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
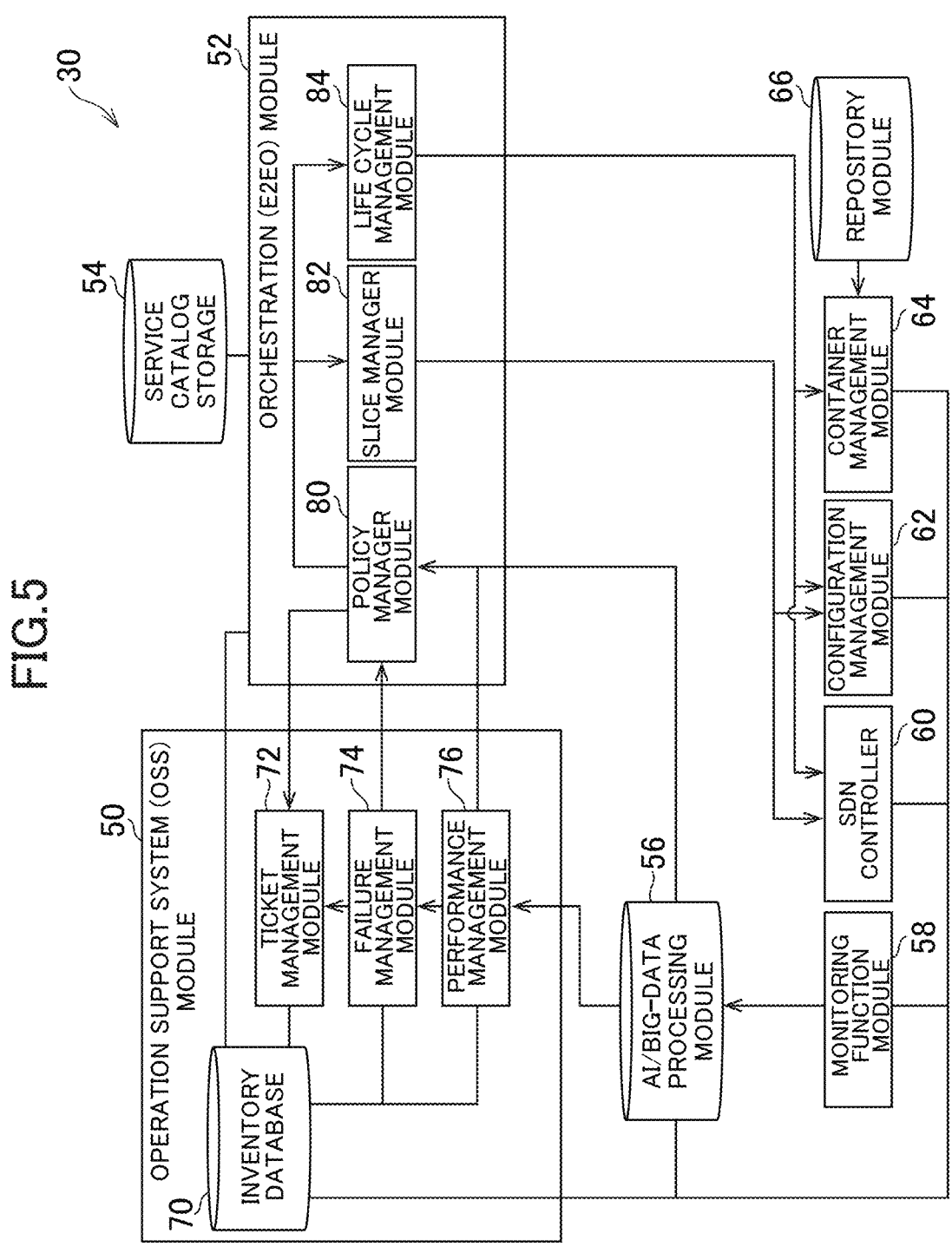
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation support system (OSS) module 50, an orchestration (end-to-end-orchestration (E2EO)) module 52, a service catalog storage 54, an AI/big-data processing module 56, a monitoring function module 58, an SDN controller 60, a configuration management module 62, a container management module 64, and a repository module 66. The OSS module 50 includes an inventory database 70, a ticket management module 72, a failure management module 74, and a performance management module 76. The E2EO module 52 includes a policy manager module 80, a slice manager module 82, and a life cycle management module 84. Those elements are implemented mainly by the processor 30a, the storage device 30b and the communication device 30c.

The functions illustrated in FIG. 5 may be implemented by executing, by the processor 30a, a program that is installed in the platform system 30, which is one or a plurality of computers, and that includes instructions corresponding to the functions. This program may be supplied to the platform system 30 via a computer-readable information storage medium such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container management module 64 executes life cycle management of a container. For example, the life cycle management includes processes relating to the construction of the container such as the deployment and setting of the container.

In this case, the platform system 30 in this embodiment may include a plurality of container management modules 64. In each of the plurality of container management modules 64, a container management tool such as Kubernetes, and a package manager such as Helm may be installed. Each of the plurality of container management modules 64 may execute the construction of a container such as the deployment of the container for a server group (for example, Kubernetes cluster) associated with the container management module 64.

The container management module 64 is not required to be included in the platform system 30. The container management module 64 may be provided in, for example, a server (that is, the RAN 32 or the core network system 34) managed by the container management module 64, or another server that is annexed to the server managed by the container management module 64.

In this embodiment, the repository module 66 stores, for example, a container image of a container included in a functional unit group (for example, NF group) that implements a network service.

The inventory database 70 is a database in which inventory information is stored. The inventory information includes, for example, information on a server arranged in the RAN 32 or the core network system 34 and managed by the platform system 30.

Further, in this embodiment, the inventory database 70 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data arranged.

The rack data included in the physical inventory data is, for example, an identifier of a rack in which the server associated with the physical inventory data is arranged.

The specification data included in the physical inventory data is, for example, data indicating the specifications of the associated with the physical inventory data. The server specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports, and the like.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

In addition, the logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to a CNFC. The CNFC data indicates, for example, attributes such as an identifier of an instance of the CNFC and the type of the CNFC. The logical inventory data may also include pod data indicating information relating to a pod included in the CNFC. The pod data indicates, for example, attributes such as an identifier of an instance of the pod and the type of the pod. The logical inventory data may also include container data indicating information relating to a container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the CNFC data may include data indicating the IP address and the host name of a CNFC indicated by the CNFC data.

The logical inventory data may also include data indicating NSSAI including one or a plurality of pieces of S-NS-SAI, which is set for each NF.

Further, the inventory database 70 can appropriately grasp the resource status in cooperation with the container management module 64. Then, the inventory database 70 appropriately updates the inventory data stored in the inventory database 70 based on the latest resource status.

Further, for example, the inventory database 70 updates the inventory data stored in the inventory database 70 in accordance with execution of an action such as construction of a new element included in the communication system 1, a change of a configuration of the elements included in the communication system 1, scaling of the elements included in the communication system 1, or replacement of the elements included in the communication system 1.

The service catalog storage 54 stores service catalog data. The service catalog data may include, for example, service template data indicating the logic to be used by the life cycle management module 84 or the like. This service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNFs or other functional units included in the network service for each type thereof. The NSD may also indicate a file name of a CNFD described later, which relates to the CNF included in the network service.

Further, a CNF descriptor (CNFD) is an example of the above-mentioned service template data. The CNFD may indicate computer resources (for example, CPU, memory, and hard disk drive) required by the CNF. For example, the CNFD may also indicate, for each of a plurality of containers included in the CNF, computer resources (for example, CPU, memory, and hard disk drive) required by the container.

The service catalog data may also include information to be used by the policy manager module 80, the information relating to a threshold value (for example, threshold value for abnormality detection) to be compared to the calculated performance index value. The performance index value is described later.

The service catalog data may also include, for example, slice template data. The slice template data includes information required for executing instantiation of the network slice, and includes, for example, the logic to be used by the slice manager module 82.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle management module 84 constructs a new network service for which a purchase request has been made in response to the purchase request for the NS by the purchaser.

The life cycle management module 84 may execute, for example, the workflow script associated with the network service to be purchased in response to the purchase request. Then, the life cycle management module 84 may execute this workflow script, to thereby instruct the container management module 64 to deploy the container included in the new network service to be purchased. Then, the container management module 64 may acquire the container image of the container from the repository module 66 and deploy a container corresponding to the container image in the server.

In addition, in this embodiment, the life cycle management module 84 executes, for example, scaling or replacement of the element included in the communication system 1. In this case, the life cycle management module 84 may output a container deployment instruction or deletion instruction to the container management module 64. Then, the container management module 64 may execute, for example, a process for deploying a container or a process for deleting a container in accordance with the instruction. In this embodiment, the life cycle management module 84 can execute such scaling and replacement that cannot be handled by Kubernetes of the container management module 64 or other tools.

The life cycle management module 84 may also output to the configuration management module 62 a configuration management instruction for a newly constructed element group or an existing element into which a new setting is input. Then, the configuration management module 62 may execute configuration management such as settings in accordance with the configuration management instruction.

The life cycle management module 84 may also output an instruction to create a communication path to the SDN controller 60. For example, the life cycle management module 84 presents, to the SDN controller 60, two IP addresses at both ends of a communication path to be created, and the SDN controller 60 creates a communication path connecting those two IP addresses to each other. The created communication path may be managed so as to be linked to those two IP addresses.

In this embodiment, the slice manager module 82 executes, for example, instantiation of a network slice. In this embodiment, the slice manager module 82 executes, for example, instantiation of a network slice by executing the logic indicated by the slice template stored in the service catalog storage 54.

The slice manager module 82 includes, for example, a network slice management function (NSMF) and a network slice sub-network management function (NSSMF) described in the third generation partnership project (3GPP) specification "TS28 533." The NSMF is a function for generating and managing network slices, and provides an NSI management service. The NSSMF is a function for generating and managing network slice subnets forming a part of a network slice, and provides an NSSI management service.

The slice manager module 82 may output to the configuration management module 62 a configuration management instruction related to the instantiation of the network slice. Then, the configuration management module 62 may execute configuration management such as settings in accordance with the configuration management instruction.

The slice manager module 82 may also present, to the SDN controller 60, two IP addresses to output an instruction to create a communication path between those two IP addresses.

In this embodiment, for example, the configuration management module 62 executes configuration management such as settings of the element group including the NEs in accordance with the configuration management instruction received from the life cycle management module 84 or the slice manager module 82.

In this embodiment, for example, the SDN controller 60 creates the communication path between the two IP addresses linked to the creation instruction in accordance with the instruction to create the communication path, which has been received from the life cycle management module 84 or the slice manager module 82.

In this case, for example, the SDN controller 60 may use segment routing technology (for example, segment routing IPv6 (SRv6)) to construct an NSI and NSSI for the server or an aggregation router present between communication paths. The SDN controller 60 may also generate an NSI and NSSI extending over a plurality of NFs to be set by issuing, to the plurality of NFs to be set, a command to set a common virtual local area network (VLAN) and a command to assign a bandwidth and a priority indicated by the setting information to the VLAN.

The SDN controller 60 may change the upper limit of the bandwidth that can be used for communication between two IP addresses without constructing a network slice.

In this embodiment, the monitoring function module 58 monitors, for example, the element group included in the communication system 1 based on a given management policy. In this case, for example, the monitoring function module 58 may monitor the element group based on a monitoring policy designated by the purchaser when the purchaser purchases the network service.

In this embodiment, the monitoring function module 58 executes monitoring at various levels, such as a slice level, an NS level, an NF level, a CNFC level, and a level of hardware such as the server.

For example, the monitoring function module 58 may set a module for outputting metric data in the hardware such as the server, or a software element included in the communication system 1 so that monitoring can be performed at the various levels described above. In this case, for example, the NF may output the metric data indicating a metric that can be measured (can be identified) by the NF to the monitoring function module 58. Further, the server may output the metric data indicating a metric relating to the hardware that can be measured (can be identified) by the server to the monitoring function module 58.

In addition, for example, the monitoring function module 58 may deploy, in the server, a sidecar container for aggregating the metric data indicating the metrics output from a plurality of containers in units of CNFCs (microservices). This sidecar container may include an agent called "exporter." The monitoring function module 58 may repeatedly execute a process for acquiring the metric data aggregated in units of microservices from the sidecar container, at predetermined monitoring intervals through use of a mechanism of a monitoring tool, for example, Prometheus capable of monitoring the container management tool such as Kubernetes.

The monitoring function module 58 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitoring function module 58 may acquire metric data indicating the performance index values to be monitored.

Then, for example, when the monitoring function module 58 acquires the above-mentioned metric data, the monitoring function module 58 outputs the metric data to the AI/big data processing module 56.

Further, the elements such as the network slice, the NS, the NF, the CNFC that are included in the communication system 1 and the hardware such as the server notify the monitoring function module 58 of various alerts (for example, notify the monitoring function module 58 of an alert with the occurrence of a failure as a trigger).

Then, for example, when the monitoring function module 58 receives the above-mentioned notification of the alert, the monitoring function module 58 outputs the notification to the AI/big-data processing module 56.

In this embodiment, the AI/big-data processing module 56 accumulates, for example, pieces of metric data and notifications of the alerts that have been output from the monitoring function module 58. In addition, in this embodiment, for example, the AI/big-data processing module 56 stores in advance a trained machine learning model.

Then, in this embodiment, for example, the AI/big-data processing module 56 executes, based on the accumulated pieces of metric data and the above-mentioned machine learning model, an estimation process such as a future prediction process for a use status and quality of service of the communication system 1. The AI/big-data processing module 56 may generate estimation result data indicating results of the estimation process.

In this embodiment, for example, the performance management module 76 calculates, based on a plurality of pieces of metric data, a performance index value (for example, KPI) that is based on metrics indicated by those pieces of metric data. The performance management module 76 may calculate a performance index value (for example, performance index value relating to an end-to-end network slice) which is a comprehensive evaluation of a plurality of types of metrics and cannot be calculated from a single piece of metric data. The performance management module 76 may generate comprehensive performance index value data indicating a performance index value being a comprehensive evaluation.

The performance management module 76 may acquire the metric data from the monitoring function module 58 through intermediation of the AI/big-data processing module 56 as illustrated in FIG. 5, or may acquire the metric data directly from the monitoring function module 58. The performance management module 76 may also calculate the performance index value based on the above-mentioned estimation result data.

In this embodiment, the failure management module 74 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure management module 74 may detect, for example, the occurrence of a failure that cannot be detected from a single piece of metric data or a single notification of the alert, based on a predetermined logic. The failure management module 74 may also generate detection failure data indicating the detected failure.

The failure management module 74 may acquire the metric data and the notification of the alert directly from the monitoring function module 58 or through intermediation of the AI/big-data processing module 56 and the performance management module 76. The failure management module 74 may also acquire the estimation result data directly from the AI/big-data processing module 56 or through intermediation of the performance management module 76.

In this embodiment, the policy manager module 80 executes a predetermined determination process based on, for example, at least any one of the above-mentioned metric data, the above-mentioned notification of the alert, the above-mentioned estimation result data, the above-mentioned comprehensive performance index value data, or the above-mentioned detection failure data.

Then, the policy manager module 80 may execute an action corresponding to a result of the determination process. For example, the policy manager module 80 may output an instruction to construct a network slice to the slice manager module 82. The policy manager module 80 may also output an instruction for scaling or replacement of the elements to the life cycle management module 84 based on the result of the determination process.

In this embodiment, the ticket management module 72 generates, for example, a ticket indicating information to be notified to an administrator of the communication system 1. The ticket management module 72 may generate a ticket indicating details of the detection failure data. The ticket management module 72 may also generate a ticket indicating a value of the performance index value data or the metric data. The ticket management module 72 may also generate a ticket indicating a determination result obtained by the policy manager module 80.

Then, the ticket management module 72 notifies the administrator of the communication system 1 of the generated ticket. The ticket management module 72 may send, for example, an email to which the generated ticket is attached to an email address of the administrator of the communication system 1.

A process relating to determination of an execution platform (for example, Kubernetes cluster or server) on which each of a plurality of applications included in the communication system 1 is to be arranged is further described in the following.

In the following description, it is assumed that each of the applications in this embodiment is linked in advance to a requirement being associated with the type of the application and relating to an execution platform on which the application is deployable. That is, each application has a requirement relating to arrangement, and the requirement differs depending on the type of application.

For example, it is assumed that each of the plurality of applications is linked to a label indicating the requirement relating to the execution platform on which the application is deployable. The label may be stored in, for example, the service catalog storage 54. The requirement may also be described in, for example, the CNFD stored in the service catalog storage 54.

In this case, for example, it is assumed that a label set to have a value of any one of "fixed," "constrained," or "unconditional" is linked to the application.

For example, the label having a value of "fixed" is linked to the application that is deployable only on a particular execution platform. In addition, an ID of the execution platform on which the application is deployable is linked to the application linked to the label having the value of "fixed."

Further, for example, the label having a value of "constrained" is linked to the application that is deployable on the execution platform that satisfies a predetermined condition. In addition, a label set to have a value indicating a specific constraint is linked to the application linked to the label having the value of "constrained."

In this case, the requirement relating to the execution platform on which an application of a first type is deployable may be a requirement relating to a location of an application of a second type. For example, the constraint being the requirement for the application of the first type may be a constraint relating to a distance from the application of the second type.

In this case, examples of the requirement relating to the execution platform on which the application of the first type is deployable and being the requirement relating to the location of the application of the second type on the assumption that the application of the second type is the AMF include "same Kubernetes cluster as that of AMF," "same fabric network as that of AMF," "same data center as that of AMF," "under control of same edge router (application router) as that of AMF," "same range (super-block or region) as that of AMF," and "within predetermined distance 'a' from AMF." For example, a label indicating a constraint such as "within 10 kilometers from AMF" may be linked to the SMF.

The constraint may also be a constraint relating to an apparatus or zone required to be present between the application of this type and an application of a particular type, such as "Demilitarized zone (DMZ) is present between own application and AMF."

As another example of the value indicating a specific constraint, there is a value indicating a requirement relating to hardware of the execution platform on which the application is to be arranged (hereinafter referred to as "hardware requirement"). Examples of such a hardware requirement include "Single root I/O virtualization (SRIOV) has been implemented," "Graphics processing unit (GPU) has been installed," and "Field-programmable gate array (FPGA) has been installed."

The hardware requirement may also be a requirement relating to a size, for example, "Number of mounted GPUs is predetermined value 'b' or more," "Size of mounted memory is predetermined value of 'c' bytes or more," or "Size of mounted storage is predetermined value of 'd' bytes or more."

In addition, in this embodiment, a plurality of kinds of requirements relating to the execution platform on which the application is deployable may be linked to the application. For example, the application may be linked to both the label indicating the requirement that "Number of mounted GPUs is predetermined value 'b' or more" and the label indicating the requirement that "Size of mounted memory is predetermined value of 'c' bytes or more."

In addition, when, for example, an application is added to the communication system 1 in accordance with the purchase of the NS, a label set to have a value indicating a requirement relating to a service level agreement (SLA) may be linked to the application.

In addition, for example, the label having a value of "unconditional" is linked to the application that is deployable on any execution platform.

Further, in this embodiment, for example, the monitoring function module 58 monitors a resource usage status on each of a plurality of execution platforms (for example, Kubernetes clusters and servers) included in the communication system 1. Further, in this embodiment, for example, the monitoring function module 58 monitors a resource usage status in each of applications being executed on the execution platforms.

In this case, the resource usage status to be monitored may be at least one of a usage status of a CPU, a usage status of a memory, a usage status of a storage, a usage status of a network, or a usage status of electric power.

Examples of the usage status of the CPU include a CPU usage rate. Examples of the usage status of the memory include a memory usage amount and a memory usage rate. Examples of the usage status of the storage include a storage usage amount and a storage usage rate. Examples of the usage status of the network include a bandwidth usage amount and a bandwidth usage rate. Examples of the usage status of the electric power include a power consumption amount.

Then, the monitoring function module 58 outputs pieces of metric data indicating results of the monitoring to the AI/big-data processing module 56. In this manner, the pieces of metric data are accumulated in the AI/big-data processing module 56.

In this for example, embodiment, an arrangement determination timing for applications is defined in advance. The arrangement determination timing arrives at, for example, predetermined execution intervals.

Further, in this embodiment, it is assumed that some applications are determined to be added to the communication system 1 at the arrangement determination timing. For example, it is assumed that a process such as construction of a new NF triggered by the purchase of an NS or scale-out of an NF triggered by an increase in load is determined to be executed.

A yet-to-be-arranged application determined to be added to the communication system 1, that is, an application to be added to the communication system 1, is hereinafter referred to as "to-be-added application."

Further, the AI/big-data processing module 56 extracts, for example, metric data indicating the last resource usage status for each of the plurality of applications being executed in the communication system 1. For example, the AI/big-data processing module 56 extracts the pieces of metric data indicating the resource usage status accumulated from a timing at which arrangement determination was last executed until the present. In another case, the AI/big-data processing module 56 extracts the pieces of metric data indicating the resource usage status collected during the last month.

Then, in this embodiment, for example, the AI/big-data processing module 56 identifies, for each of the plurality of applications being executed in the communication system 1, an actual result value of the resource usage status of the application based on the pieces of metric data extracted for the application. The usage status having the actual result value to be identified may be, for example, at least one of the usage status of the CPU, the usage status of the memory, the usage status of the storage, the usage status of the network, or the usage status of the electric power.

Then, for each of the applications being executed in the communication system 1, the AI/big-data processing module 56 generates application resource data (hereinafter referred to as "AP resource data") indicating a resource amount required by the application as exemplified in FIG. 7.

For example, the AI/big-data processing module 56 may generate, for a plurality of applications, pieces of AP resource data indicating the actual result values of the resource usage statuses of the applications based on the extracted pieces of metric data. In regard to the application being executed, the actual result value of the resource usage status is considered to correspond to the resource amount required by the application.

The AP resource data in this embodiment may include a plurality of separate pieces of AP resource data indicating resource amounts regarding resources of mutually different types. In the example of FIG. 7, the AP resource data includes five separate pieces of AP resource data (CPU AP resource data, memory AP resource data, storage AP resource data, network AP resource data, and power consumption AP resource data).

The separate pieces of AP resource data may also include a plurality of pieces of period AP resource data associated with each period type. In this embodiment, for example, as illustrated in FIG. 7, actual result values (represented by a1 to a16 in FIG. 7) of resource usage statuses regarding 16 period types respectively associated with eight time slots of every three hours in terms of a weekday and a holiday are identified. Then, an identified actual result value is set as the value of the piece of period AP resource data of the period type associated with the actual result value.

For example, the piece of metric data indicating the usage status of the CPU regarding the time slot of 0:00 to 3:00 on a weekday may be identified from among the pieces of metric data indicating the resource usage status accumulated from the timing at which the arrangement determination was last executed until the present. Then, the value of the piece of period AP resource data included in the CPU AP resource data in association with 0:00 to 3:00 on a weekday may be determined based on the identified piece of metric data. In this case, for example, a representative value a1 such as an average value or a maximum value of the CPU usage rate indicated by the identified piece of metric data may be set as the value of the piece of period AP resource data included in the CPU AP resource data in association with 0:00 to 3:00 on a weekday.

Figure 7:
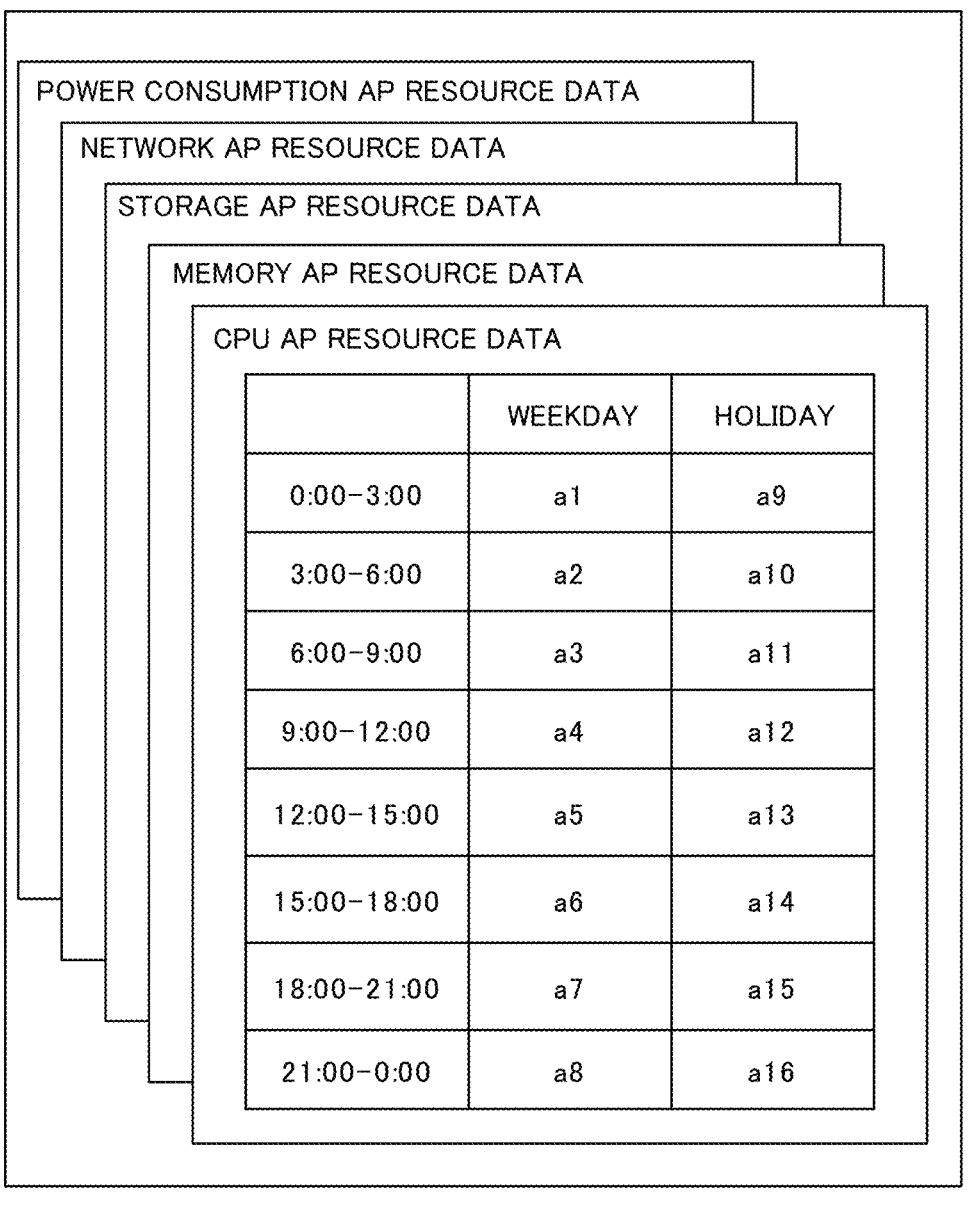
FIG. 7 is a diagram for illustrating an example of AP resource data.

In the same manner, the values of the other pieces of period AP resource data included in the CPU AP resource data are also determined, to thereby generate the CPU AP resource data illustrated in FIG. 7.

Further, in the same manner, the memory AP resource data is generated based on the pieces of metric data indicating the usage status of the memory accumulated from the timing at which the arrangement determination was last executed until the present. Further, the storage AP resource data is generated based on the pieces of metric data indicating the usage status of the storage accumulated from the timing at which the arrangement determination was last executed until the present. Further, the network AP resource data is generated based on the pieces of metric data indicating the usage status of the network accumulated from the timing at which the arrangement determination was last executed until the present. Further, the power consumption AP resource data is generated based on the pieces of metric data indicating the usage status of the electric power accumulated from the timing at which the arrangement determination was last executed until the present.

In this embodiment, for example, the AI/big-data processing module 56 also generates, for each of the to-be-added applications, AP resource data indicating a resource amount required by the to-be-added application.

In this case, for example, the resource amount required by the to-be-added application may be defined in advance. For example, the resource amount required by the to-be-added application may be described in the above-mentioned CNFD. Further, the AI/big-data processing module 56 may refer to the CNFD stored in the service catalog storage 54 to identify the resource amount required by the to-be-added application.

In this case, for example, the required resource amount may be identified for each of the CPU, the memory, the storage, the network, and the power consumption. The required resource amount may also be identified for each of the above-mentioned plurality of period types.

In another case, for example, the AI/big-data processing module 56 may identify the resource amount required by the to-be-added application based on the actual result value of the resource usage status in a running application of the same type as that of the to-be-added application. For example, the AI/big-data processing module 56 may identify the resource amount required by the to-be-added application based on the actual result value of the resource usage status in an application having the same SLA requirement as that of the to-be-added application.

For example, the AI/big-data processing module 56 may identify a difference between the actual result value of the resource usage status before addition of an application of the same type as that of the to-be-added application and the actual result value of the resource usage status after the addition of the application on an execution platform on which the application is operating. Then, the AI/big-data processing module 56 may identify the resource amount required by the to-be-added application based on the identified difference. For example, a representative value (for example, maximum value or average value) of the identified difference may be identified as a value indicating the resource amount required by the to-be-added application.

Then, the AP resource data indicating the resource amount required by the to-be-added application, which is identified as described above, may be generated.

In this case, for each period type, an execution platform on which a difference regarding the period type between the resource usage statuses before and after the addition of the application of the same type as that of the to-be-added application is the largest may be identified. Then, for each period type, the difference between the actual result value of the resource usage status before the addition of the application and the actual result value of the resource usage status after the addition of the application may be set as the value of the piece of period AP resource data regarding the period type.

The AP resource data indicating the resource amount required by the to-be-added application may also be generated through use of a trained machine learning model.

In the above-mentioned manner, for each of the application being executed in the communication system 1 and the application to be added to the communication system 1, the AP resource data indicating the resource amount required by the application is generated.

Then, the policy manager module 80 identifies, for each of the plurality of applications, the requirement being associated with the type of the application and relating to the execution platform on which the application is deployable. In this case, for example, the value of the label linked to the application may be identified.

Then, the policy manager module 80 determines the order of the plurality of applications based on the identified requirements. In other words, the policy manager module 80 determines a number for each of the plurality of applications. Then, the execution platforms on which the respective applications are to be arranged are determined in the order of the applications, that is, in the order of the determined numbers. The order is hereinafter referred to also as "determination order."

For example, the policy manager module 80 classifies each of the plurality of applications into any one category of "existing-and-fixed," "new-and-fixed," "existing-and-constrained," "new-and-constrained," "existing-and-unconditional," or "new-and-unconditional."

For example, the application linked to the label having the value of "fixed" and already constructed in the communication system 1 is classified into the category of "existing-and-fixed." The to-be-added application linked to the label having the value of "fixed" is classified into the category of "new-and-fixed."

Further, for example, the application linked to the label having the value of "constrained" and already constructed in the communication system 1 is classified into the category of "existing-and-constrained." The to-be-added application linked to the label having the value of "constrained" is classified into the category of "new-and-constrained."

Further, for example, the application linked to the label having the value of "unconditional" and already constructed in the communication system 1 is classified into the category of "existing-and-unconditional." The to-be-added application linked to the label having the value of "unconditional" is classified into the category of "new-and-unconditional."

Then, in this embodiment, for example, the policy manager module 80 determines a stated order of (1) the application having the category of "existing-and-fixed," (2) the application having the category of "new-and-fixed," (3) the application having the category of "existing-and-constrained," (4) the application having the category of "new-and-constrained," (5) the application having the category of "existing-and-unconditional," and (6) the application having the category of "new-and-unconditional" as the determination order of the execution platforms on which the applications are to be arranged.

In this manner, the policy manager module 80 may determine, for the plurality of applications, the determination order of the execution platforms on which the applications are to be arranged so that the determination order becomes a stated order of the application that is deployable only on a particular execution platform, the application that is deployable on the execution platform that satisfies a predetermined condition, and the application that is deployable on any execution platform. That is, the determination order may be set to such an order that the execution platforms on which the applications are to be arranged are determined in the stated order of the application that is deployable only on a particular execution platform, the application that is deployable on the execution platform that satisfies a predetermined condition, and the application that is deployable on any execution platform.

Then, the policy manager module 80 determines, in accordance with the determination order determined as described above, the execution platforms on which the respective plurality of applications are to be arranged. In this case, for example, the execution platforms on which the applications are to be arranged are determined for both the application being executed in the communication system 1 and the application to be added to the communication system 1.

In this embodiment, for example, the policy manager module 80 first determines, for at least one application having the category of "existing-and-fixed," the execution platform on which the application is being executed as the execution platform on which the application is to be arranged. That is, such an application is not to be replaced.

Subsequently, the policy manager module 80 determines, for at least one application having the category of "new-and-fixed," the execution platform identified by the ID indicated by the label linked to the application as the execution platform on which the application is to be arranged.

Subsequently, the policy manager module 80 determines, for at least one application having the category of "existing-and-constrained," the execution platform on which the application is to be arranged.

In this case, in this embodiment, the policy manager module 80 may determine, for at least one application having the category of "existing-and-constrained," the determination order of the execution platforms on which the applications are to be arranged. The order determined in this manner is hereinafter referred to as "existing-and-constrained-based determination order."

In this case, for example, the policy manager module 80 may determine the existing-and-constrained-based determination order based on a predetermined standard.

For example, the policy manager module 80 may determine the existing-and-constrained-based determination order so that the existing-and-constrained-based determination order becomes a descending order of severity of the requirement for the number of mounted GPUs, that is, a descending order of the number of GPUs indicated in the requirement.

In addition, it is assumed that a requirement relating to the execution platform on which the application of the first type is deployable is a requirement relating to the location of the application of the second type. In this case, the policy manager module 80 may determine the determination order of the execution platforms on which the applications are to be arranged so that the determination order position of the application of the first type is behind the determination order position of the application of the second type. That is, the application of the first type may be placed at a position after that of the application of second type in the determination order. Thus, the execution platform on which the application of the second type is to be arranged is determined earlier than the execution platform on which the application of the first type is to be arranged.

For example, when the SMF is linked to the label indicating "within 10 kilometers from AMF," the determination order of the execution platforms on which the applications are to be arranged may be determined so that the determination order position of the SME is behind the determination order position of the AMF.

In this case, for example, the order may be determined in the descending order of the number of GPUs indicated in the requirement, and for those for which the above-mentioned requirement relating to the location is set, the existing-and-constrained-based determination order may be determined by changing the order positions thereof. For example, in the above-mentioned example, the determination order of the execution platforms on which the applications are to be arranged may be changed so that the determination order position of the SMF is behind the determination order position of the AMF.

Then, the policy manager module 80 selects an application placed at the earliest position in the existing-and-constrained-based determination order among the applications having the category of "existing-and-constrained" for which the execution platforms on which the applications are to be arranged have not been determined yet. The application selected in this manner is now referred to as "focused application."

Then, the policy manager module 80 determines the execution platform on which the focused application is to be arranged.

In this case, for example, the policy manager module 80 extracts execution platforms on which the focused application is deployable. Specifically, for example, those that satisfy the requirement linked to the focused application are extracted. The execution platform extracted in this manner is hereinafter referred to as "candidate platform." In this case, the policy manager module 80 may identify the candidate platform based on the inventory data stored in the inventory database 70.

In this case, for example, the execution platform that satisfies a hardware requirement such as "Number of mounted GPUs is predetermined value 'b' or more" may be extracted as the candidate platform.

Further, for example, when the SMF linked to a location requirement indicating "same Kubernetes cluster as that of AMF" is the focused application, the same Kubernetes cluster as that of the AMF for which the execution platform on which the AMF is to be arranged has been determined may be extracted as the candidate platform.

Further, for example, when the SMF linked to a location requirement indicating "within 10 kilometers from AMF" is the focused application, the execution platform included in a data center located within a distance of 10 kilometers from the AMF for which the execution platform on which the AMF is to be arranged has been determined may be extracted as the candidate platform.

Then, the policy manager module 80 determines any one of the candidate platforms as the execution platform on which the focused application is to be arranged.

In this case, for example, the execution platform on which the focused application is to be arranged may be randomly determined from the candidate platforms. In another case, the execution platform on which the focused application is to be arranged may be determined from among the candidate platforms based on an individual leveling index value described later.

Subsequently, the policy manager module 80 determines, for at least one application having the category of "new-and-constrained," the execution platform on which the application is to be arranged.

In this case, in this embodiment, the policy manager module 80 may determine, for at least one application having the category of "new-and-constrained," the determination order of the execution platforms on which the applications are to be arranged. The order determined in this manner is hereinafter referred to as "new-and-constrained-based determination order."

In this case, the new-and-constrained-based determination order may be determined by, for example, the same method as the above-mentioned method for the existing-and-constrained-based determination order.

Then, the policy manager module 80 selects, as the focused application, an application placed at the earliest position in the new-and-constrained-based determination order among the applications having the category of "new-and-constrained" for which the execution platforms on which the applications are to be arranged have not been determined yet.

Then, the policy manager module 80 determines the execution platform on which the focused application is to be arranged.

In this case, the execution platform on which the focused application is to be arranged may be determined by, for example, the same method as the above-mentioned determination method for the execution platforms on which the applications having the category of "existing-and-constrained" are to be arranged.

Subsequently, the policy manager module 80 determines, for at least one application having the category of "existing-and-unconditional," the execution platform on which the application is to be arranged.

Finally, the policy manager module 80 determines, for at least one application having the category of "new-and-unconditional," the execution platform on which the application is to be arranged.

In regard to at least one application having the category of "existing-and-unconditional" or "new-and-unconditional," the execution platform on which the application is to be arranged may be randomly determined from among the execution platforms on which the applications are deployable. In another case, for example, the execution platform on which the application is to be arranged may be determined based on the individual leveling index value described later.

Now, an example of the individual leveling index value is described.

In this embodiment, for example, the AI/big-data processing module 56 may identify, for each of a plurality of candidate platforms, a predicted value of the resource usage status on the candidate platform. For example, the AI/big-data processing module 56 may generate usage status predicted-value data exemplified in FIG. 8 and associated with each of the plurality of candidate platforms.

Figure 8:
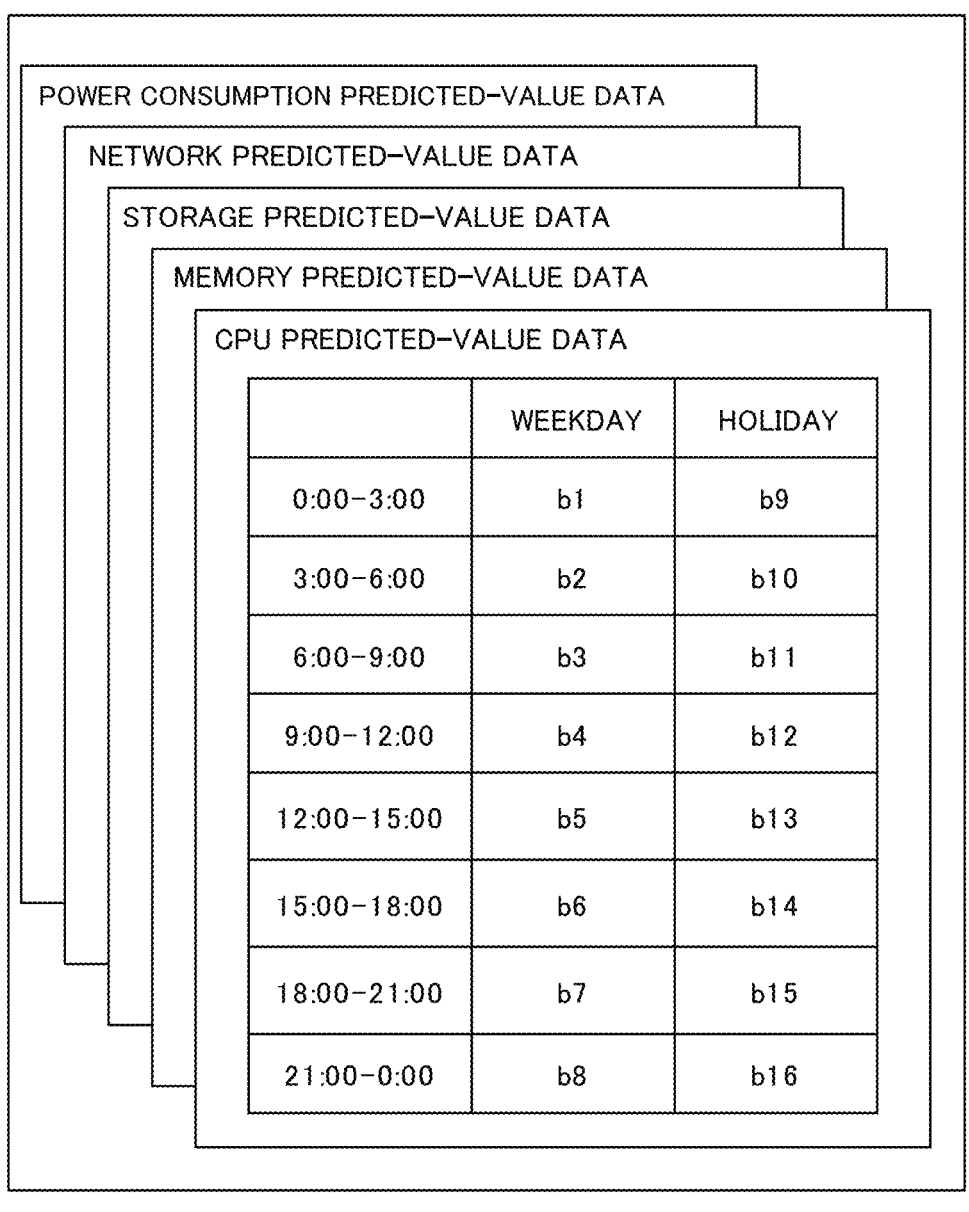
FIG. 8 is a diagram for illustrating an example of usage status predicted-value data.

The usage status predicted-value data in this embodiment may include a plurality of separate pieces of predicted-value statuses of resources of mutually data indicating usage different types. In the example of FIG. 8, the usage status predicted-value data includes five separate pieces of predicted-value data (CPU predicted-value data, memory predicted-value data, storage predicted-value data, network predicted-value data, and power consumption predicted-value data). In addition, the separate piece of predicted-value data includes a plurality of pieces of period predicted-value data respectively associated with the above-mentioned period types. In the example of FIG. 8, the separate piece of predicted-value data includes 16 pieces of period predicted-value data (represented by b1 to b16 in FIG. 8).

The AI/big-data processing module 56 may generate arrangement predicted-value data and non-arrangement predicted-value data for each of the plurality of candidate platforms. The arrangement predicted-value data is the usage status predicted-value data indicating, in a case in which the focused application has been arranged on the candidate platform, the predicted value of the resource usage status on the candidate platform. The non-arrangement predicted-value data is the usage status predicted-value data indicating, in a case in which the focused application is not arranged on the candidate platform, the predicted value of the resource usage status on the candidate platform.

For example, for each of the candidate platforms that satisfy the requirement linked to the focused application, the AI/big-data processing module 56 sums up the value of the AP resource data indicating the resource amount required by the application determined to be arranged on the candidate platform and the value of the AP resource data indicating the resource amount required by the focused application. Thus, the arrangement predicted-value data associated with the candidate platform is generated.

For example, the AI/big-data processing module 56 may sum up the values of the CPU AP resource data for the application determined to be arranged on the candidate platform and the focused application regarding the time slot of 0:00 to 3:00 on a weekday. Then, a value obtained by the summation may be determined as the value of the period predicted-value data associated with the time slot of 0:00 to 3:00 on a weekday and included in the CPU predicted-value data of the arrangement predicted-value data. Then, this value may be set as the value of the period predicted-value data associated with the time slot of 0:00 to 3:00 on a weekday and included in the CPU predicted-value data of the arrangement predicted-value data.

In the same manner, the values of the other pieces of period predicted-value data included in the CPU predicted-value data of the arrangement predicted-value data are also determined, to thereby generate the CPU predicted-value data of the arrangement predicted-value data.

In the same manner as well, the memory predicted-value data of the arrangement predicted-value data is generated based on the memory AP resource data. In addition, the storage predicted-value data of the arrangement predicted-value data is generated based on the storage AP resource data. In addition, the network predicted-value data of the arrangement predicted-value data is generated based on the network AP resource data. In addition, the power consumption predicted-value data of the arrangement predicted-value data is generated based on the power consumption AP resource data.

For example, for each of the candidate platforms that satisfy the requirement linked to the focused application, the AI/big-data processing module 56 sums up the value of the AP resource data indicating the resource amount required by the application determined to be arranged on the candidate platform. Thus, the non-arrangement predicted-value data associated with the candidate platform is generated.

For example, the AI/big-data processing module 56 may sum up the values of the CPU AP resource data for the application determined to be arranged on the candidate platform regarding the time slot of 0:00 to 3:00 on a weekday. Then, a value obtained by the summation may be determined as the value of the period predicted-value data associated with the time slot of 0:00 to 3:00 on a weekday and included in the CPU predicted-value data of the non-arrangement predicted-value data. Then, this value may be set as the value of the period predicted-value data associated with the time slot of 0:00 to 3:00 on a weekday and included in the CPU predicted-value data of the non-arrangement predicted-value data.

In the same manner, the values of the other pieces of period predicted-value data included in the CPU predicted-value data of the non-arrangement predicted-value data are also determined, to thereby generate the CPU predicted-value data of the non-arrangement predicted-value data.

In the same manner as well, the memory predicted-value data of the non-arrangement predicted-value data is generated based on the memory AP resource data. In addition, the storage predicted-value data of the non-arrangement predicted-value data is generated based on the storage AP resource data. In addition, the network predicted-value data of the non-arrangement predicted-value data is generated based on the network AP resource data. In addition, the power consumption predicted-value data of the non-arrangement predicted-value data is generated based on the power consumption AP resource data.

In the examples of FIG. 7 and FIG. 8, the number of period types is 16, but the number of period types is not limited to 16. For example, the period types in this embodiment may be a total of 14 period types including two time slots of daytime and nighttime on each day of the week. The number of period types is desired to be suppressed to such a number as to inhibit a calculation amount from becoming excessive.

In this embodiment, the non-arrangement predicted-value data and the arrangement predicted-value data may also be generated through use of a trained machine learning model.

Further, in this embodiment, for example, for each of the plurality of candidate platforms, the AI/big-data processing module 56 identifies, based on the predicted values identified as described above, the individual leveling index value indicating, in a case in which the focused application has been constructed on the candidate platform, at least one of a degree of leveling of the resource usage status on the candidate platform or a degree of leveling of the resource usage statuses among the plurality of candidate platforms.

In this case, the AI/big-data processing module 56 may identify the individual leveling index value based on the above-mentioned predicted value for each period type.

For example, the AI/big-data processing module 56 may identify an individual leveling index value indicating, in the case in which the focused application has been constructed on the candidate platform, a variation in the predicted values for the respective period types on the candidate platform.

For example, for each of the plurality of candidate platforms, the AI/big-data processing module 56 may identify, for each of the five separate pieces of predicted-value data of the arrangement predicted-value data associated with the candidate platform, a variance in the values of the 16 pieces of period predicted-value data included in the separate pieces of predicted-value data.

Then, the AI/big-data processing module 56 may identify, as the individual leveling index value associated with the candidate platform, a weighted linear sum of the variances identified for the five separate pieces of predicted-value data provided with a given weight. The individual leveling index value may be identified based on a standard deviation instead of the variance.

The individual leveling index value identified in this manner corresponds to an example of the individual leveling index value indicating, in the case in which the focused application has been constructed on the candidate platform, the degree of leveling of the resource usage status on the candidate platform.

The AI/big-data processing module 56 may also identify, for example, the individual leveling index value indicating, in the case in which the focused application has been constructed on the candidate platform, a difference between a maximum value and a minimum value of the predicted values for the respective period types on the candidate platform.

Further, for each of the plurality of candidate platforms, the AI/big-data processing module 56 may identify, for each of the five separate pieces of predicted-value data of the arrangement predicted-value data associated with the candidate platform, a difference between a maximum value and a minimum value among the values of the 16 pieces of period predicted-value data included in the separate pieces of predicted-value data.

Then, the AI/big-data processing module 56 may identify, as the individual leveling index value associated with the candidate platform, a weighted linear sum of the differences identified for the five separate pieces of predicted-value data provided with a given weight.

The individual leveling index value identified in this manner corresponds to an example of the individual leveling index value indicating, in the case in which the focused application has been constructed on the candidate platform, the degree of leveling of the resource usage status on the candidate platform.

Further, in this embodiment, for example, for each of the plurality of candidate platforms, the AI/big-data processing module 56 may identify, as the predicted values associated with the candidate platform, the predicted values of the resource usage statuses on the respective plurality of candidate platforms in a situation in which the focused application is arranged on the candidate platform and is not arranged on the other candidate platforms.

Then, the AI/big-data processing module 56 may identify the individual leveling index value indicating, in the case in which the focused application has been arranged on the candidate platform, the variation in the predicted values of the resource usage statuses among the plurality of candidate platforms.

In another case, for each of the plurality of candidate platforms, the AI/big-data processing module 56 may identify the individual leveling index value indicating, in the case in which the focused application has been arranged on the candidate platform, a total sum of absolute values of differences between the predicted values of the resource usage statuses on the respective plurality of candidate platforms and a predetermined value.

For example, it is assumed that the number of candidate platforms is "n" (this "n" represents an integer of 1 or more). In this case, for example, for each of the "n" candidate platforms, the AI/big-data processing module 56 may calculate, based on the non-arrangement predicted-value data associated with the candidate platform, a non-arrangement resource usage rate being, in the case in which the focused application is not arranged on the candidate platform, a resource usage rate associated with the candidate platform. For example, a representative value of the predicted value of the CPU usage rate, a representative value of the predicted value of the memory usage rate, a representative value of the predicted value of the storage usage rate, and a representative value of the predicted value of the bandwidth usage rate may be calculated for each of a plurality of period types. Then, a representative value regarding those four representative values may be calculated as resource usage rate associated with the non-arrangement candidate platform.

Further, for example, for each of the "n" candidate platforms, the AI/big-data processing module 56 may calculate, based on the arrangement predicted-value data associated with the candidate platform, an arrangement resource usage rate being a resource usage rate associated with the candidate platform. For example, a representative value of the predicted value of the CPU usage rate, a representative value of the predicted value of the memory usage rate, a representative value of the predicted value of the storage usage rate, and a representative value of the predicted value of the bandwidth usage rate may be calculated for each of a plurality of period types. Then, a representative value regarding those four representative values may be calculated as the arrangement resource usage rate associated with the candidate platform.

Examples of the above-mentioned representative values include an average value and a maximum value. In addition, examples of the above-mentioned "representative value regarding four representative values" include an average value of the above-mentioned four average values, a maximum value of the above-mentioned four average values, an average value of the above-mentioned four maximum values, and a maximum value of the above-mentioned four maximum values.

Then, the AI/big-data processing module 56 may calculate the individual leveling index value associated with the candidate platform for each of the "n" candidate platforms based on the above-mentioned non-arrangement resource usage rate and the above-mentioned arrangement resource usage rate.

For example, the value of the arrangement resource usage rate of a focused platform being a certain candidate platform and the values of the non-arrangement resource usage rates of the other (n−1) candidate platforms may be identified. Then, the variance or standard deviation of the identified "n" values may be calculated as the individual leveling index value associated with the focused platform.

In another case, a difference between the value of the arrangement resource usage rate regarding the focused platform and a predetermined value (for example, 70%) and a difference between the value of the non-arrangement resource usage rates regarding the other (n−1) candidate platforms and the predetermined value (for example, 70%) may be identified. Then, a total sum of absolute values of the identified "n" differences may be calculated as the individual leveling index value associated with the focused platform.

The individual leveling index value identified in this manner corresponds to an example of the individual leveling index value indicating the degree of leveling of the resource usage statuses among the plurality of candidate platforms.

Further, in this embodiment, the individual leveling index value associated with the candidate platform may be identified based on, in the case in which the focused application has been constructed on the candidate platform, a first individual leveling index value indicating the degree of leveling of the resource usage status on the candidate platform and a second individual leveling index value indicating the degree of leveling of the resource usage statuses among the plurality of candidate platforms.

For example, an average value of the first individual leveling index value and the second individual leveling index value may be identified as the individual leveling index value associated with the candidate platform. In another case, for example, a weighted average value of the first individual leveling index value and the second individual leveling index value based on a given weight may be identified as the individual leveling index value associated with the candidate platform.

Then, the policy manager module 80 determines the execution platform on which the focused application is to be arranged from among the plurality of candidate platforms based on the individual leveling index value identified as described above.

For example, when the individual leveling index value indicating, in the case in which the focused application has been constructed on the candidate platform, the variation in the predicted values for the respective period types on the candidate platform is identified, the execution platform on which the focused application is to be arranged may be determined based on smallness of the variation indicated by the individual leveling index value.

Further, for example, when the individual leveling index value indicating, in the case in which the focused application has been arranged on the candidate platform, the variation in the predicted values of the resource usage statuses among the plurality of candidate platforms is identified, the candidate platform on which the focused application is to be arranged may be determined based on the smallness of the variation indicated by the individual leveling index value.

For example, the candidate platform associated with the smallest value among the individual leveling index values indicating the variations respectively associated with the plurality of candidate platforms may be determined as the execution platform on which the focused application is to be arranged.

Further, for example, when the individual leveling index value indicating, in the case in which the focused application has been constructed on the candidate platform, the difference between the maximum value and the minimum value of the predicted values for the respective period types on the candidate platform is identified, the execution platform on which the focused application is to be arranged may be determined based on smallness of the difference indicated by the individual leveling index value. For example, the candidate platform associated with the smallest value among the individual leveling index values indicating the differences respectively associated with the plurality of candidate platforms may be determined as the execution platform on which the focused application is to be arranged.

Further, for example, when the individual leveling index value indicating, in the case in which the focused application has been arranged on the candidate platform, the total sum of the absolute values of the differences between the predicted values of the resource usage statuses on the respective plurality of candidate platforms and the predetermined value is identified, the execution platform on which the to-be-added application is to be arranged may be determined based on smallness of the total sum of the absolute values of the differences indicated by the individual leveling index values. For example, the candidate platform associated with the smallest value among the individual leveling index values indicating the total sum of the absolute values of the differences respectively associated with the plurality of candidate platforms may be determined as the execution platform on which the focused application is to be arranged.

The individual leveling index value described above becomes smaller as the degree of leveling becomes higher. Such an individual leveling index value as to become larger as the degree of leveling becomes higher may be used instead. In this case, the candidate platform associated with the largest value among the individual leveling index values respectively associated with the plurality of candidate platforms is determined as the execution platform on which the focused application is to be arranged.

As described above, in regard to the applications having the category of "existing-and-constrained," the execution platforms on which the applications are to be arranged may be determined based on the leveling index values sequentially from the application placed at the earliest position in the existing-and-constrained-based determination order.

In regard to the applications having the category of "new-and-constrained," the execution platforms on which the applications are to be arranged may be determined based on the individual leveling index values sequentially from the application placed at the earliest position in the new-and-constrained-based determination order.

In regard to the applications having the category of "existing-and-unconditional" or "new-and-unconditional," the execution platforms on which the applications are to be arranged may be determined based on the individual leveling index values in a random order.

Then, in this embodiment, for example, when the execution platforms on which the applications are to be arranged have been determined as described above for the applications of all categories, the life cycle management module 84, the container management module 64, and the configuration management module 62 arrange each of the plurality of applications on the execution platform determined as the execution platform on which the application is to be arranged.

In this case, for example, for the to-be-added application that has not yet been constructed in the communication system 1, the life cycle management module 84, the container management module 64, and the configuration management module 62 newly construct the to-be-added application on the execution platform determined for the application.

Further, for example, for the application that has already been constructed in the communication system 1, the life cycle management module 84, the container management module 64, and the configuration management module 62 replace the application onto the execution platform determined for the application. Further, in this embodiment, as described above, a plurality of kinds of requirements may be set as requirements relating to the execution platform on which the application is deployable. In such a case, the policy manager module 80 may identify, for each of the plurality of applications, the plurality of kinds of requirements relating to the execution platform on which the application is deployable.

Then, for each of the plurality of kinds of requirements, the policy manager module 80 may determine, based on the requirements, the determination order of the execution platforms on which the plurality of applications are to be arranged.

For example, it is assumed that the requirement for the number of mounted GPUs, the requirement for the size of the mounted memory, and the requirement for the size of the mounted storage are linked to each of the applications having the category of "existing-and-constrained" or "new-and-constrained."

In this case, for example, the policy manager module 80 may determine, for the applications having the category of "existing-and-constrained," the existing-and-constrained-based determination order so that the existing-and-constrained-based determination order becomes a descending order of severity of the requirement for the number of mounted GPUs, that is, a descending order of the number indicated in the requirement. Further, the policy manager module 80 may also determine, for the applications having the category of "new-and-constrained," the new-and-constrained-based determination order so that the new-and-constrained-based determination order becomes a descending order of severity of the requirement for the number of mounted GPUs, that is, a descending order of the number indicated in the requirement.

Then, a stated order of the applications having the category of "existing-and-fixed," the applications having the category of "new-and-fixed," the applications having the category of "existing-and-constrained" conforming to the existing-and-constrained-based determination order, the applications having the category of "new-and-constrained" conforming to the new-and-constrained-based determination order, the applications having the category of "existing-and-unconditional" conforming to a random order, and the applications having the category of "new-and-unconditional" conforming to a random order is referred to as "GPU order."

In the same manner as well, for example, the policy manager module 80 may determine the determination order of the execution platforms on which the respective plurality of applications are to be arranged so that the determination order becomes a descending order of severity of the requirement for the size of the mounted memory, that is, a descending order of the size indicated in the requirement. The order determined in this manner is referred to as "memory order."

In the same manner as well, for example, the policy manager module 80 may determine the determination order of the execution platforms on which the respective plurality of applications are to be arranged so that the determination order becomes a descending order of severity of the requirement for the size of the mounted storage, that is, a descending order of the size indicated in the requirement. The order determined in this manner is referred to as "storage order."

In this manner, a plurality of orders may be determined as the determination order of the execution platforms on which the applications are to be arranged.

Then, the AI/big-data processing module 56 may calculate a comprehensive leveling index value obtained in a case in which the execution platforms on which all the applications are to be arranged have been determined in accordance with the GPU order.

The comprehensive leveling index value in this embodiment herein refers to a leveling index value indicating, in a case in which the plurality of applications have been arranged on the execution platforms determined based on any one of the plurality of kinds of requirements, at least one of the degree of leveling of the resource usage status on each individual execution platform or the degree of leveling of the resource usage statuses among the plurality of execution platforms.

In this case, for example, as described above, the AI/big-data processing module 56 may calculate the individual leveling index values respectively associated with the plurality of candidate platforms. Then, the AI/big-data processing module 56 may calculate, as the comprehensive leveling index value, the representative value (average value or maximum value) of the individual leveling index values calculated in this manner.

For example, after the execution platforms on which all the applications are to be respectively arranged have been determined in accordance with the GPU order, for each of the plurality of execution platforms, the above-mentioned individual leveling index value indicating the degree of leveling of the resource usage status on the execution platform may be calculated based on the AP resource data of the application determined to be arranged on the execution platform. Then, the representative value (average value or maximum value) of the individual leveling index values calculated in this manner for the plurality of execution platforms may be calculated as the comprehensive leveling index value obtained in a case in which the execution platforms on which all the applications are to be respectively arranged have been determined in accordance with the GPU order.

The comprehensive leveling index value may also be a value indicating the degree of leveling of the resource usage statuses among the plurality of candidate platforms.

For example, after the execution platforms on which all the applications are to be respectively arranged have been determined in accordance with the GPU order, for each of the plurality of execution platforms, the resource usage rate of the execution platform may be calculated based on the AP resource data of the application determined to be arranged on the execution platform.

Then, the variance or standard deviation of the values of the resource usage rates calculated in this manner for the plurality of execution platforms may be calculated as the comprehensive leveling index value obtained in the case in which the execution platforms on which all the applications are to be arranged have been determined in accordance with the GPU order.

In another case, a total sum of the absolute values of differences between of the values of the resource usage rates regarding the plurality of execution platforms and the predetermined value (for example, 70%) may be calculated as the comprehensive leveling index value obtained in the case in which the execution platforms on which all the applications are to be arranged have been determined in accordance with the GPU order.

Then, in the same manner, the comprehensive leveling index value obtained in the case in which the execution platforms on which all the applications are to be arranged have been determined in accordance with the memory order may be calculated. Further, in the same manner, the comprehensive leveling index value obtained in the case in which the execution platforms on which all the applications are to be arranged have been determined in accordance with the storage order may be calculated.

Then, the policy manager module 80 may determine the execution platforms on which the plurality of applications are to be arranged in accordance with any one of the determination orders determined for the respective plurality of kinds of requirements.

For example, the policy manager module 80 may determine the execution platforms on which the plurality of applications are to be arranged in accordance with the determination order determined based on the comprehensive leveling index value from among the determination orders determined for the respective plurality of kinds of requirements.

For example, the execution platforms determined in the order associated with the comprehensive leveling index value having the highest degree of leveling among the comprehensive leveling index values identified for a plurality of orders as described above may be determined as the execution platform on which the respective applications are to be arranged.

Further, in this embodiment, the policy manager module 80 may determine, based on a certain kind of requirement, the determination order of the execution platforms on which the plurality of applications are to be arranged.

Then, the policy manager module 80 may determine whether or not the degree of leveling indicated by the above-mentioned comprehensive leveling index value obtained in a case in which the execution platforms on which the respective applications are to be arranged have been determined in accordance with the determination order is higher than a predetermined degree.

Then, when the degree of leveling indicated by the above-mentioned comprehensive leveling index value is higher than the predetermined degree, the policy manager module 80 may determine, in accordance with the determination order, the execution platforms on which the plurality of applications are to be arranged. Otherwise, the policy manager module 80 may again determine, based on the requirement of another kind, the determination order of the execution platforms on which the plurality of applications are to be arranged.

For example, when the degree of leveling indicated by the comprehensive leveling index value obtained in a case in which the execution platforms on which the respective applications are to be arranged have been determined in accordance with the GPU order is higher than the predetermined degree, the execution platforms determined in this manner may be determined as the execution platforms on which the respective applications are to be arranged. Otherwise, the comprehensive leveling index value obtained in a case in which the execution platform on which each application is to be arranged have been determined in accordance with the memory order may be identified.

Then, when the degree of leveling indicated by the comprehensive leveling index value obtained in a case in which the execution platforms on which the respective applications are to be arranged have been determined in accordance with the memory order is higher than the predetermined degree, the execution platforms determined in this manner may be determined as the execution platforms on which the respective applications are to be arranged. Otherwise, the comprehensive leveling index value obtained in a case in which the execution platform on which each application is to be arranged have been determined in accordance with the storage order may be identified.

Then, the execution platforms determined in this manner may be determined as the execution platforms on which the respective applications are to be arranged.

The service catalog storage 54 may also store constraint strength data in which the requirement relating to the execution platform on which the application is deployable and a constraint strength in the arrangement are associated with each other.

For example, as shown in FIG. 9, the constraint strength data in which the requirement indicating "same Kubernetes cluster as that of AMF" and a strength of "5" are associated with each other may be stored in the service catalog storage 54. The constraint strength data in which the requirement indicating "same fabric network as that of AMF" and a strength of "4" are associated with each other may be stored in the service catalog storage 54. The constraint strength data in which the requirement indicating "same data center as that of AMF" and a strength of "3" are associated with each other may be stored in the service catalog storage 54. The constraint strength data in which the requirement indicating "under control of same edge router (application router) as that of AMF" and a strength of "2" are associated with each other may be stored in the service catalog storage 54. The constraint strength data in which the requirement indicating "same range (super-block or region) as that of AMF" and a strength of "1" are associated with each other may be stored in the service catalog storage 54.

Then, the policy manager module 80 may determine the determination order of the execution platforms on which the plurality of applications are to be arranged so that the determination order becomes a descending order of the constraint strength identified based on the requirements relating to the execution platforms on which the applications are deployable and the constraint strength data. That is, the determination order may be determined so that the execution platform on which the application is to be arranged is determined earlier as the strength becomes higher.

Further, in this embodiment, when the execution platform on which all the applications are to be arranged cannot be determined even in the above-mentioned manner, a notification recommending additional installation of an execution platform may be transmitted to the administrator of the communication system 1.

As described above, the construction of each application into the communication system 1 involves, depending on a type of application, an application required to be arranged on an execution platform that satisfies a requirement associated with the type.

Accordingly, when a plurality of types of applications are arranged on execution platforms in a random order, there may occur an adverse situation in which resources of the execution platforms cannot be utilized effectively, for example, in which an application arranged at a later time cannot be arranged on any execution platform or in which there is an imbalance between the execution platforms on which the applications are arranged.

In this embodiment, the execution platforms on which the applications are to be arranged are determined in an appropriate order as described above. In this manner, according to this embodiment, it is possible to effectively utilize the resources of the execution platforms on which a plurality of types of applications are constructed.

Figure 10:
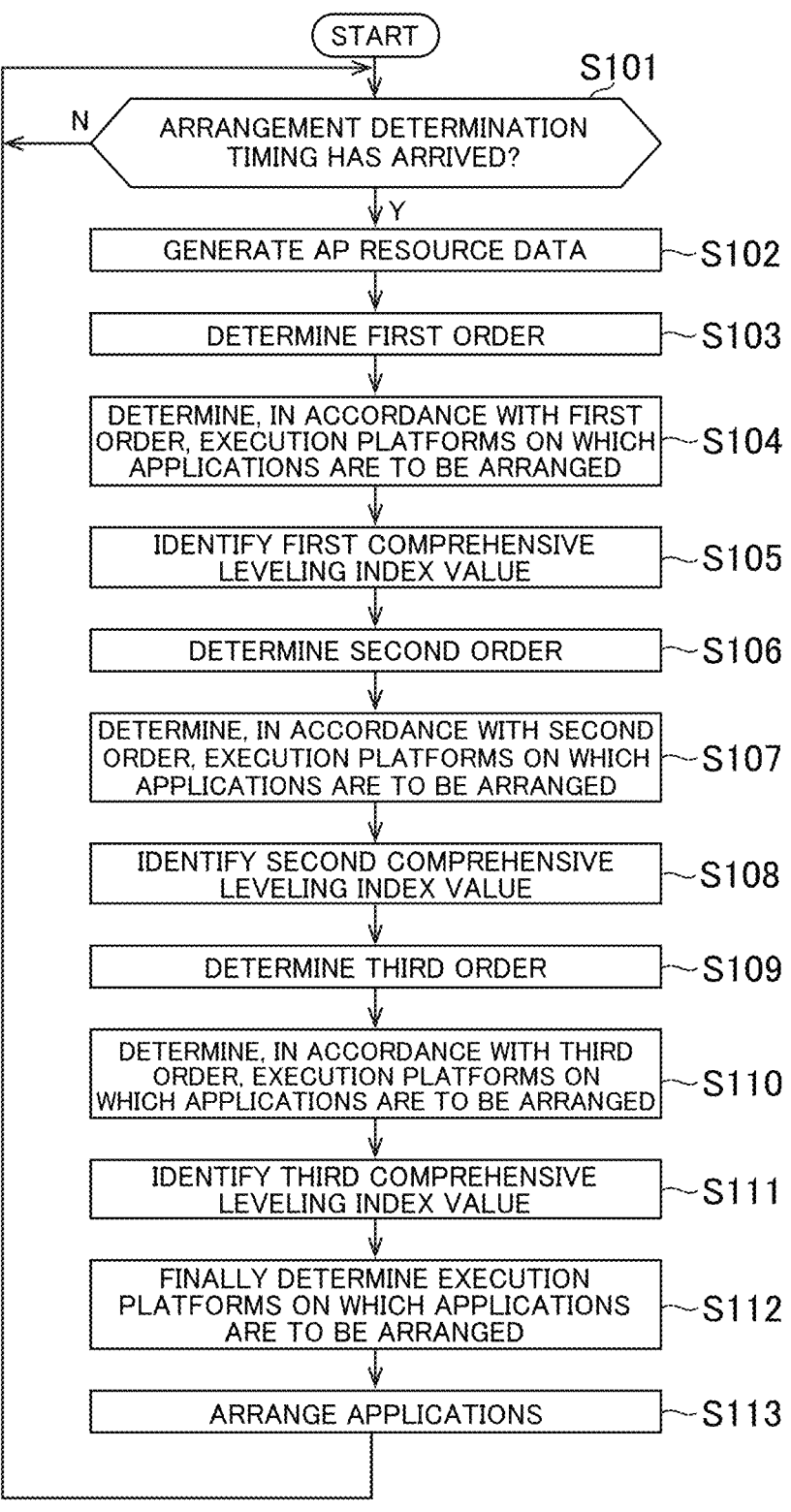
FIG. 10 is a flow chart for illustrating an example of a flow of a process performed by the platform system in the one embodiment of the present invention.

Now, an example of a flow of a process relating to the arrangement of applications and performed by the platform system 30 in this embodiment is described with reference to a flow chart exemplified in FIG. 10. In this process example, it is assumed that a plurality of applications to be subjected to this process example are classified into any one category of "existing-and-fixed," "new-and-fixed," "existing-and-constrained," "new-and-constrained," "existing-and-unconditional," or "new-and-unconditional."

In this process example, the policy manager module 80 stands by for arrival of the arrangement determination timing (Step S101).

When the arrangement determination timing has arrived, the AI/big-data processing module 56 generates, for each application being executed in the communication system 1 and each to-be-added application, pieces of AP resource data indicating the resource amounts required by those applications (Step S102).

Then, the policy manager module 80 determines, based on a requirement of a first kind, a first order being the determination order of the execution platforms on which the plurality of applications having the AP resource data generated in the process step of Step S102 are to be arranged (Step S103).

Then, the policy manager module 80 determines, in accordance with the first order, the execution platforms on which the plurality of applications having the AP resource data generated in the process step of Step S102 are to be arranged (Step S104).

Then, the AI/big-data processing module 56 identifies, based on the AP resource data generated in the process step of Step S102, a first comprehensive leveling index value being the comprehensive leveling index value obtained in a case in which the applications have been arranged in the arrangement determined in the process step of Step S104 (Step S105).

Then, the policy manager module 80 determines, based on a requirement of a second kind different from the requirement of the above-mentioned first kind, a second order being the determination order of the execution platforms on which the plurality of applications having the AP resource data generated in the process step of Step S102 are to be arranged (Step S106).

Then, the policy module 80 determines, in accordance with the second order, the execution platforms on which the plurality of applications having the AP resource data generated in the process step of Step S102 are to be arranged (Step S107).

Then, the AI/big-data processing module 56 identifies, based on the AP resource data generated in the process step of Step S102, a second comprehensive leveling index value being the comprehensive leveling index value obtained in a case in which the applications have been n arranged in the arrangement determined in the process step of Step S107 (Step S108).

Then, the policy manager module 80 determines, based on a requirement of a third kind different from the requirement of the above-mentioned first kind and the requirement of the second kind, a third order being the determination order of the execution platforms on which the plurality of applications having the AP resource data generated in the process step of Step S102 are to be arranged (Step S109).

Then, the policy manager module 80 determines, in accordance with the third order, the execution platforms on which the plurality of applications having the AP resource data generated in the process step of Step S102 are to be arranged (Step S110).

Then, the AI/big-data processing module 56 identifies, based on the AP resource data generated in the process step of Step S102, a third comprehensive leveling index value being the comprehensive leveling index value obtained in a case in which the applications have been arranged in the arrangement determined in the process step of Step S110 (Step S111).

Then, the policy manager module 80 finally determines, for each of the applications being executed in the communication system 1 and the to-be-added applications, the execution platforms on which the applications are to be arranged (Step S112). In the process step of Step S112, for example, the comprehensive leveling index value having the value of the highest degree of leveling of the resource usage statuses may be identified from among the first comprehensive leveling index value identified in the process step of Step S105, the second comprehensive leveling index value identified in the process step of Step S108, and the third comprehensive leveling index value identified in the process step of Step S111. Then, the execution platforms determined in the order corresponding to the identified comprehensive leveling index value are finally determined as the execution platforms on which the respective applications are to be arranged.

For example, when the degree of leveling of the resource usage statuses indicated by the first comprehensive leveling index value is the highest, the execution platforms determined in the process step of Step S104 are finally determined as the execution platforms on which the respective applications are to be arranged. Further, for example, when the degree of leveling of the resource usage statuses indicated by the second comprehensive leveling index value is the highest, the execution platforms determined in the process step of Step S107 are finally determined as the execution platforms on which the respective applications are to be arranged. Further, for example, when the degree of leveling of the resource usage statuses indicated by the third comprehensive leveling index value is the highest, the execution platforms determined in the process step of Step S110 are finally determined as the execution platforms on which the respective applications are to be arranged.

Then, the life cycle management module 84, the container management module 64, and the configuration management module 62 arrange the applications being executed in the communication system 1 and the to-be-added applications on the execution platforms determined in the process step of Step S112 as the execution platforms on which the respective applications are to be arranged (Step S113).

In this case, when an application being executed in the communication system 1 is determined to be arranged on an execution platform different from the execution platform on which the application is being executed, the application is replaced. Meanwhile, the to-be-added application is newly constructed on the determined execution platform.

Then, the process returns to the process step of Step S101.

In another case, when the degree of leveling indicated by the first comprehensive leveling index value identified in the process step of Step S105 is higher than the predetermined degree, the process steps of from Step S106 to Step S111 may be skipped, and the process step of Step S112 may be performed to finally determine the execution platforms determined in the first order as the execution platforms on which the respective applications are to be arranged.

Further, when the degree of leveling indicated by the second comprehensive leveling index value identified in the process step of Step S108 is higher than the predetermined degree, the process steps of from Step S109 to Step S111 may be skipped, and the process step of Step S112 may be performed to finally determine the execution platforms determined in the second order as the execution platforms on which the respective applications are to be arranged.

It should be noted that the present invention is not limited to the above-mentioned embodiment.

For example, the execution platform in this embodiment may be a Kubernetes cluster. The execution platform in this embodiment may also be a server.

Further, the application in this embodiment may be a network function included in the communication system 1 or an application other than the network function such as an application for big data analysis or an AI.

Further, the individual leveling index value and the comprehensive leveling index value are described above as being calculated based on all of the usage status of the CPU, the usage status of the memory, the usage status of the storage, the usage status of the network, and the usage status of the electric power, but the individual leveling index value and the comprehensive leveling index value may be calculated based on some of those statuses. For example, the individual leveling index value and the comprehensive leveling index value may be calculated based on any one of the usage status of the CPU, the usage status of the memory, the usage status of the storage, the usage status of the network, or the usage status of the electric power.

Further, the functional unit in this embodiment is not limited to those illustrated in FIG. 3. For example, the functional unit in this embodiment may be an access and mobility management function (AMF), a session management function (SMF), or another network node.

Further, the functional unit in this embodiment is not required to be an NE in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may implemented through use of a hypervisor-type or host-type virtualization technology instead of the container-type virtualization technology. Further, the functional unit in this embodiment is not required to be implemented by software, and may be implemented by hardware, for example, by an electronic circuit. Further, the functional unit in this embodiment may be implemented by a combination of an electronic circuit and software.

The invention claimed is:

1. An arrangement system, comprising:

at least one processor; and at least one memory device storing instructions which, when executed by the at least one processor, cause the at least one processor to perform operations comprising:

identifying, for each of a plurality of applications, a requirement being associated with a type of the each of the plurality of the applications and relating to an execution platform on which the each of the plurality of the applications is deployable, the type of the each of the plurality of the applications being one of an application that is deployable only on a particular execution platform, an application that is deployable on the execution platform that satisfies a predetermined condition, or an application that is deployable on any execution platform;

determining, based on the requirement, an order of the plurality of the applications;

determining, in accordance with the determined order, the execution platforms on which the respective plurality of the applications are to be arranged; and arranging each of the plurality of the applications on the execution platform determined for the each of the plurality of the applications, wherein identifying comprises identifying, for the each of the plurality of the applications, a plurality of kinds of requirements relating to the execution platform on which the each of the plurality of the applications is deployable, each kind being associated with the type of the each of the plurality of the applications, wherein determining the order comprises determining, separately for each of the plurality of kinds of requirements, a distinct order based on the each of the plurality of kinds of requirements, and wherein determining the execution platforms comprises determining, in accordance with any one of a plurality of the orders determined for the respective plurality of kinds of requirements, the execution platforms on which the plurality of the applications is to be arranged.

2. The arrangement system according to claim 1, wherein arranging comprises newly constructing, for one of the plurality of the applications that has not yet been constructed, the one of the plurality of the applications on the execution platform determined for the one of the plurality of the applications, when the each of the plurality of the applications is arranged on the execution platform determined for the each of the plurality of the applications.

3. The arrangement system according to claim 1, wherein arranging comprises replacing, for one of the plurality of the applications that has already been constructed, the one of the plurality of the applications onto the execution platform determined for the one of the plurality of the applications, when the each of the plurality of the applications is arranged on the execution platform determined for the each of the plurality of the applications.

4. The arrangement system according to claim 1, the operations further comprise storing constraint strength data in which the requirement and a constraint strength in the arrangement of each of the plurality of the applications are associated with each other, wherein determining the order comprises determining the order so that the order becomes a descending order of the constraint strength identified based on the requirement and the constraint strength data.

5. The arrangement system according to claim 1, wherein determining the order comprises determining the order so that the order becomes a stated order of the application that is deployable only on a particular execution platform, the application that is deployable on the execution platform that satisfies a predetermined condition, and the application that is deployable on any execution platform.

6. The arrangement system according to claim 1, wherein determining the order comprises placing, in the order, the applications of a first type at positions after the applications of a second type when a requirement relating to the execution platform on which the applications of the first type are arrangeable is a requirement relating to locations of the applications of the second type.

7. The arrangement system according to claim 1, the operations further comprise calculating, for each of the plurality of the orders determined for the respective plurality of kinds of requirements, a leveling index value indicating, in a case in which the plurality of the applications have been arranged on the execution platforms in accordance with the each of the plurality of the orders, at least one of a degree of leveling of a resource usage status on each individual execution platform or a degree of leveling of resource usage statuses among the plurality of the execution platforms, wherein determining the execution platforms comprises determining the execution platforms on which the plurality of the applications is to be arranged in accordance with an order determined based on the leveling index value from among the plurality of the orders determined for the respective plurality of kinds of requirements.

8. The arrangement system according to claim 1, wherein determining the order comprises determining a first order based on the requirement of a certain kind among the plurality of kinds, wherein the operations further comprise calculating a leveling index value indicating, in a case in which the plurality of the applications have been arranged on the execution platforms in accordance with the determined order, at least one of a degree of leveling of a resource usage status on each individual execution platform or a degree of leveling of resource usage statuses among the plurality of the execution platforms, wherein determining the execution platforms comprises determining, when the degree of leveling indicated by the leveling index value is higher than a predetermined degree, the execution platforms on which the plurality of the applications are to be arranged, in accordance with the determined order, and wherein determining the order comprises again determining, when the degree of leveling indicated by the leveling index value is not higher than the predetermined degree, a second order based on the requirement of another kind among the plurality of kinds.

9. The arrangement system according to claim 8, wherein the resource usage status is at least one of a usage status of a CPU, a usage status of a memory, a usage status of a storage, a usage status of a network, or a usage status of electric power.

10. The arrangement system according to claim 1, wherein the execution platform is a cluster formed of one or more containers generated by a virtualization technology.

11. The arrangement system according to claim 1, wherein the applications are included in a communication system.

12. The arrangement system according to claim 11, wherein the each of the plurality of the applications is a network function.

13. An arrangement method, comprising:

identifying, for each of a plurality of applications, a requirement being associated with a type of the each of the plurality of the applications and relating to an execution platform on which the each of the plurality of the applications is deployable, the type of the each of the plurality of the applications being one of an application that is deployable only on a particular execution platform, an application that is deployable on the execution platform that satisfies a predetermined condition, or an application that is deployable on any execution platform;

determining, based on the requirement, an order of the plurality of the applications;

determining, in accordance with the determined order, the execution platforms on which the respective plurality of the applications are to be arranged; and arranging each of the plurality of the applications on the execution platform determined for the each of the plurality of the applications, wherein identifying comprises identifying, for the each of the plurality of the applications, a plurality of kinds of requirements relating to the execution platform on which the each of the plurality of the applications is deployable, each kind being associated with the type of the each of the plurality of the applications, wherein determining the order comprises determining, separately for each of the plurality of kinds of requirements, a distinct order based on the each of the plurality of kinds of requirements, and wherein determining the execution platforms comprises determining, in accordance with any one of a plurality of the orders determined for the respective plurality of kinds of requirements, the execution platforms on which the plurality of the applications is to be arranged.

14. The arrangement system according to claim 7, wherein the resource usage status is at least one of a usage status of a CPU, a usage status of a memory, a usage status of a storage, a usage status of a network, or a usage status of electric power.

\* \* \* \* \*